US009552675B2

(12) United States Patent
Walters et al.

(10) Patent No.: US 9,552,675 B2
(45) Date of Patent: Jan. 24, 2017

(54) DISPLAY APPLICATION AND PERSPECTIVE VIEWS OF VIRTUAL SPACE

(71) Applicants: Christopher L. Walters, Brooklyn, NY (US); Frank P. Mosca, Jr., Bronx, NY (US)

(72) Inventors: Christopher L. Walters, Brooklyn, NY (US); Frank P. Mosca, Jr., Bronx, NY (US)

(73) Assignee: Time Traveler App LLC, Bronx, NY (US)

(*) Notice: Subject to any disclaimer, the term of this patent is extended or adjusted under 35 U.S.C. 154(b) by 233 days.

(21) Appl. No.: 14/293,840

(22) Filed: Jun. 2, 2014

(65) Prior Publication Data
US 2014/0354690 A1 Dec. 4, 2014

Related U.S. Application Data

(60) Provisional application No. 62/006,581, filed on Jun. 2, 2014, provisional application No. 61/830,353, filed on Jun. 3, 2013.

(51) Int. Cl.
G09G 5/10 (2006.01)
G06T 19/00 (2011.01)
H04W 4/04 (2009.01)

(52) U.S. Cl.
CPC .............. G06T 19/006 (2013.01); H04W 4/04 (2013.01)

(58) Field of Classification Search
None
See application file for complete search history.

(56) References Cited

U.S. PATENT DOCUMENTS

| 2012/0105473 A1* | 5/2012 | Bar-Zeev | G02B 27/017 345/633 |
| 2012/0113142 A1* | 5/2012 | Adhikari | G06Q 30/0623 345/633 |
| 2012/0229909 A1* | 9/2012 | Clavin | G02B 27/017 359/630 |
| 2013/0083011 A1* | 4/2013 | Geisner | G09G 5/00 345/419 |
| 2013/0088514 A1* | 4/2013 | Breuss-Schneeweis | G06T 19/006 345/633 |
| 2013/0187952 A1* | 7/2013 | Berkovich | G01S 5/16 345/633 |

(Continued)

Primary Examiner — David H Chu
(74) Attorney, Agent, or Firm — Chapin IP Law, LLC

(57) ABSTRACT

A display management resource associated with a mobile device controls display of images on a respective display screen of the mobile device. The display management resource receives location information indicating a location of the mobile device in a geographical region. Additionally, the display management resource receives input from a user operating the mobile device. The input can be any suitable information such as a command to play back images on the display screen of the mobile device. The display management resource maps the input to content such as virtual images such as images associated with an historical event that occurred in the past. Using the virtual images, the display management resource initiates display of a rendition of the virtual images from different perspectives depending on an orientation and location of the mobile device and corresponding display screen.

23 Claims, 20 Drawing Sheets

(56) References Cited

U.S. PATENT DOCUMENTS

| | | | | |
|---|---|---|---|---|
| 2014/0368532 A1* | 12/2014 | Keane | ............... | G02B 27/017 |
| | | | | 345/619 |
| 2015/0170420 A1* | 6/2015 | Ahn | ............... | G06T 7/004 |
| | | | | 345/156 |
| 2015/0227795 A1* | 8/2015 | Starner | ............. | G06K 9/00671 |
| | | | | 345/156 |
| 2015/0277121 A1* | 10/2015 | Fridental | ............ | G02B 27/0101 |
| | | | | 348/54 |

* cited by examiner

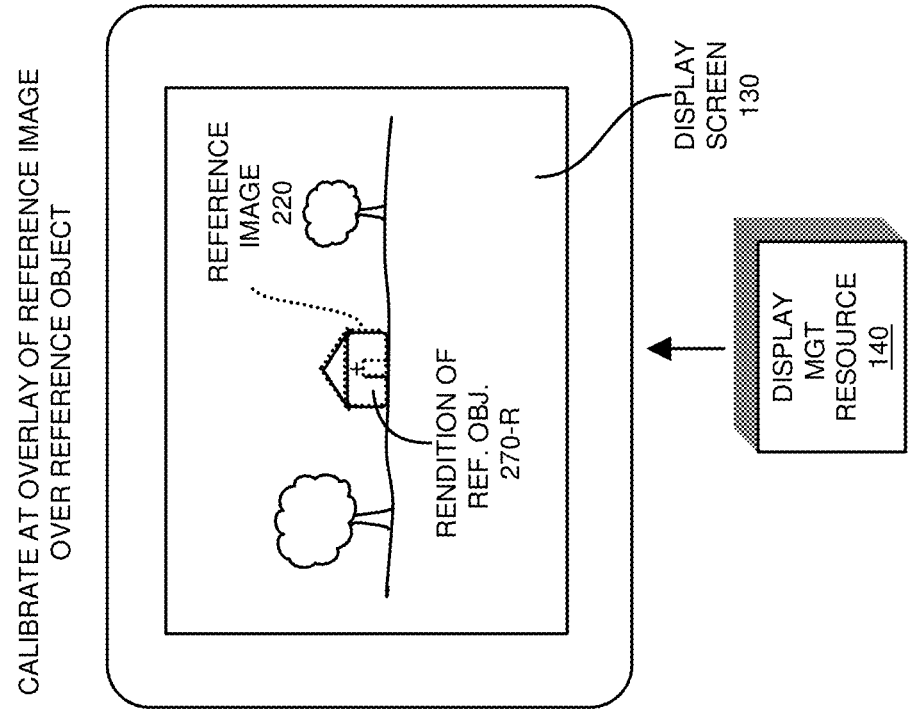
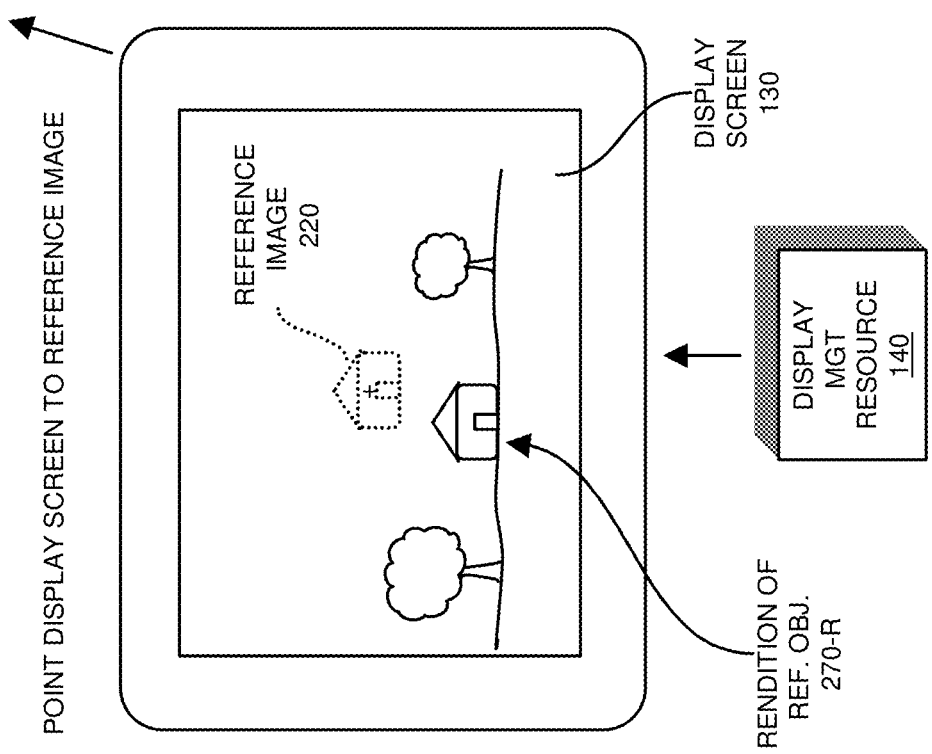
FIG. 3

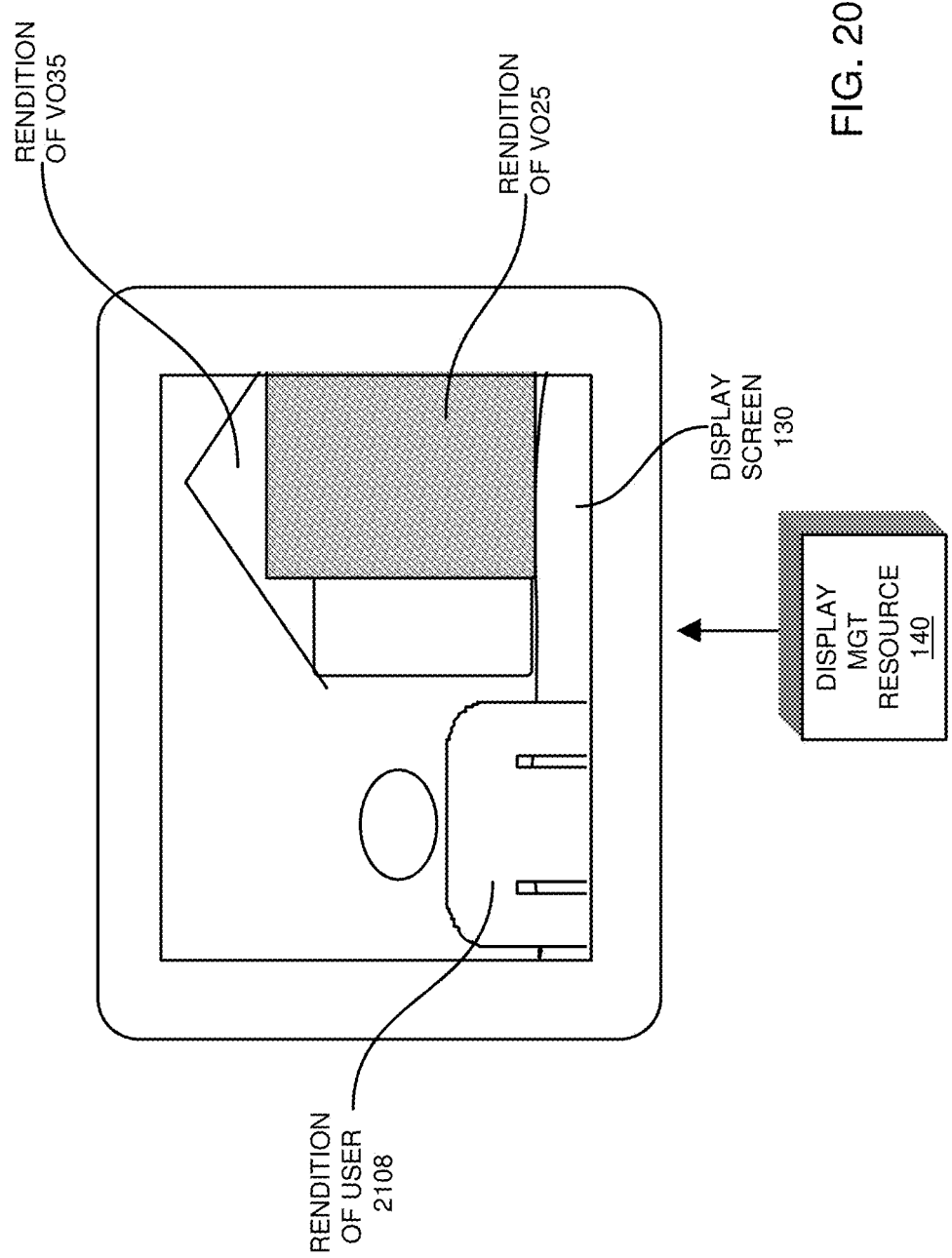

DISPLAY APPLICATION AND PERSPECTIVE VIEWS OF VIRTUAL SPACE

RELATED APPLICATIONS

This application is related to and claims the benefit of earlier filed U.S. Provisional Patent Application Ser. No. 62/006,581 entitled "Parallax Equations for Use in Mobile Devices", filed on Jun. 2, 2014, the entire teachings of which are incorporated herein by this reference.

This application is also related to and claims the benefit of earlier filed U.S. Provisional Patent Application Ser. No. 61/830,353 entitled "Time Traveler Mobile Application," filed on Jun. 3, 2013, the entire teachings of which are incorporated herein by this reference.

BACKGROUND

In general, augmented reality is a view of a physical, real-world environment whose elements are augmented in some manner. For example, it is well known that a camera disposed on a respective mobile communication device can be used to capture a respective image and display it on a display screen. Augmented reality can include creating a supplemental image (that is not in the field of view of the camera) and overlaying the supplemental image onto the respective image captured by the camera. Via the overlay of the supplemental image onto a real captured image, the image of reality is augmented by the supplemental image.

BRIEF DESCRIPTION OF EMBODIMENTS

Embodiments herein deviate with respect to conventional display techniques. For example, embodiments herein include novel ways of producing viewable renditions of content for display on a respective display screen of a mobile device depending on a location and orientation of the display screen in a three-dimensional space. In one embodiment, the techniques as described herein enable a respective user to use a display screen of a mobile device as a window into history.

More specifically, in accordance with one embodiment, a display management resource associated with a mobile device controls display of images on a respective display screen of the mobile device. In one embodiment, the display management resource receives location information indicating a location of the mobile device in a geographical region. Additionally, the display management resource receives input from a user operating the mobile device. The input can be any suitable information such as a command to play back images on the display screen of the mobile device. The display management resource maps the input to content such as virtual images of an historical event (which, in one embodiment, occurred at the location in the past). Using the virtual images, the display management resource initiates display of a rendition of the virtual images (such as historical event) from different perspectives depending on an orientation of a display screen of the mobile device at the location In accordance with more specific embodiments, the mobile device can be configured to include a location detection resource that detects a location of the mobile device in a geographical region. The mobile device also can be configured to include an orientation detection resource that detects an angular orientation (in any number of dimensions) of the display screen/mobile device at the mobile device's current location. The display management resource in the mobile device receives the location information from the location detection resource. The display management resource receives orientation information (such as an orientation vector) from the orientation detection resource. The orientation information (such as orientation vector) indicates a direction that an image sensor device (such as a camera) on the mobile device points in the geographical region. The display management resource utilizes the vector to define a viewing window through a first image layer and a second image layer. The viewing window defines a region in the first image layer to be superimposed onto a region in the second image layer. Each of the image layers can include one or more virtual objects. The display management resource utilizes the region in the first image layer (and one or more corresponding virtual objects) and the region in the second image layer (and one or more corresponding virtual objects) to produce a viewable rendition of the historical event for display on the display screen of the mobile device. Renditions of virtual objects in the image layer nearest the user of the mobile device can be given highest priority for display. For example, virtual objects in the first image layer can be displayed over virtual objects in the second farther layer if the objects occupy a same line of view.

Embodiments herein further include providing perspective views of the virtual objects in different layers depending on an orientation and location of the mobile device in a physical space.

One or more embodiments herein are useful over conventional techniques because they provide the user with a more realistic viewing experience of an historical event than conventional techniques. For example, according to certain embodiments herein, via updating of a perspective virtual view, a user is able to move about a geographical and view around renditions of virtual objects associated with the historical event in a viewing window.

These and other more specific embodiments are disclosed in more detail below.

Note that any of the resources as discussed herein can include one or more computerized devices, mobile devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. The instructions, when executed by computer processor hardware, cause the computer processor hardware (such as in a mobile computer device) to: receive location information, the location information indicating a location of a mobile device in a geographical region; receive input from a user operating the mobile device; map the input to an historical event that occurred at the location; and initiate display of a rendition of the historical event from different perspectives depending on an orientation of a display screen of the mobile device.

One or more embodiments herein include a computer readable storage medium and/or system having instructions stored thereon. The instructions, when executed by computer processor hardware, cause the computer processor hardware (such as in a security system) to: receive location information indicating a location of a mobile device in a geographical region; receive a vector indicating an orientation of a display screen of the mobile device; utilize the vector to define a viewing window through a first image layer and a second image layer, the viewing window defining a region in the first image layer to be superimposed onto a region in the second image layer; and utilize the region in the first image layer and the region in the second image layer to produce a viewable rendition for display on the display screen of the mobile device.

The ordering of the operations above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for facilitating installation of corresponding wireless access points in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 3 is an example diagram illustrating calibration of a mobile device according to embodiments herein.

FIG. 20 is an example diagram illustrating overlaying of a user image on a virtual image according to embodiments herein.

Figure 1:
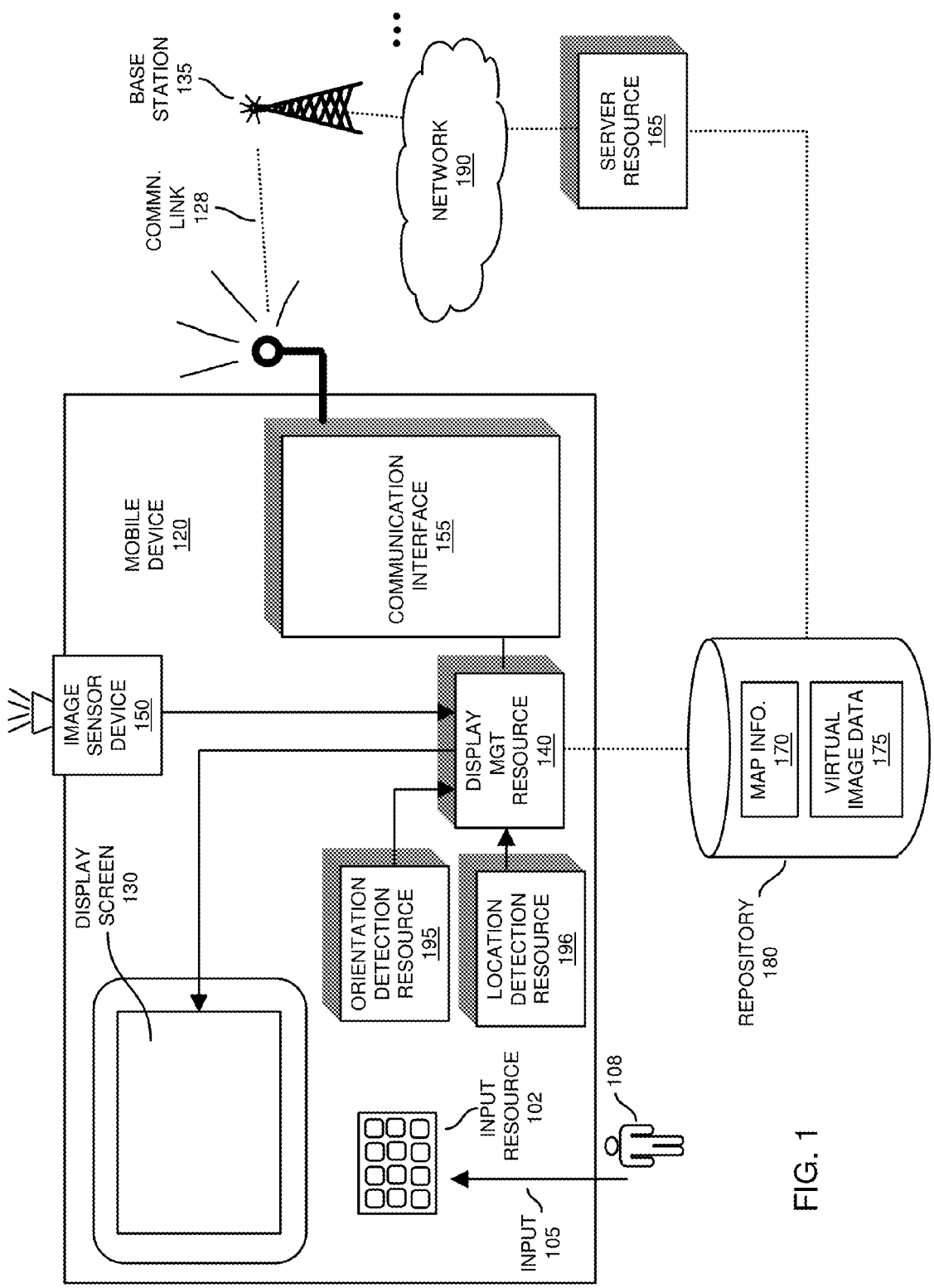
FIG. 1 is an example diagram illustrating a mobile device configured to execute operations according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

FIG. 1 is an example diagram illustrating a mobile device configured to execute operations according to embodiments herein. Note that in addition to the resources as shown, mobile device 120 can include any additional hardware and software resources to carry out operations as discussed herein.

More specifically, as shown in this example embodiment, mobile device 120 (such as a IPAD™, IPOD™, mobile phone device, laptop computer, tablet computer, etc.) includes a display screen 130, image sensor device 150, input resource 102, orientation detection resource 195, location detection resource 196, display management resource 140, communication interface 155, etc.

Each of the resources in mobile device 120 operate in a cooperative manner to display perspective views of virtual images (which may include a portion of real-time captured images) such as historical events.

For example, input resource 102 can be any suitable type of resource such as a keypad, touchscreen, mouse, microphone, etc., to receive control input 105 from user 108. Via input resource 102, user 108 is able to control operations of mobile device 120.

During operation, display screen 130 initiates display of corresponding images (virtual images) in accordance with input from display management resource 140.

Note that the execution of display management resource in mobile device 120 is shown by way of non-limiting example only and that all or a portion of the functionality associated with display management resource 140 can be executed at one or more remote locations with respect to the mobile device 120.

In this example embodiment, mobile device 120 includes one or more image sensor devices to capture images of objects in a surrounding geographical region. For example, mobile device 120 can include an image sensor device 150 on a front facing of the mobile device 120 (opposite a facing of the display screen 130) to view images in front of user 108 and mobile device 120 in the geographical region. In accordance with further embodiments, the mobile device 120 can include an additional image sensor device to receive images from an opposite direction such as from a direction of the user 108 viewing display screen 130. Thus, display management resource 140 can receive images of objects located in front of the mobile device 120 as well as receive images of user 108 and objects located in back of the mobile device 120.

As its name suggests, the orientation detection resource 195 constantly monitors an orientation of the mobile device 120 and corresponding display screen 130. Orientation detection resource 195 can include any suitable circuitry to detect a respective orientation of the mobile device 120 and corresponding display screen 130 in three-dimensional space. In one embodiment, the orientation detection resource includes any suitable resources such as accelerometer circuitry to produce orientation information (such as compass data). The orientation detection resource 195 produces orientation information or compass data (indicating an angular orientation of the mobile device 120 in three-dimensional space) and forwards it to display management resource 140.

Via the orientation information received from orientation detection resource 195, the display manager 140 is apprised of a current orientation of the mobile device 120 and corresponding display screen 130. As will be discussed later in the specification, the orientation information will be useful to generate an appropriate perspective of virtual images for display on the display screen 130 for viewing by user 108.

The orientation detection resource 195 can be configured to detect an orientation of the mobile device 120 and corresponding display screen 130 in any suitable manner. For example, in one non-limiting example embodiment, the orientation detection resource 195 can be configured to receive input from image sensor device 150 disposed on front facing of the mobile device 120 opposite the display screen 130. Given a current location of the mobile device 120, the orientation detection resource 195 can be configured to use image recognition techniques to determine orientation based on real-time images from the image sensor device 150.

In other words, while the mobile device 120 is at a given location in three-dimensional space, the orientation detection resource 195 can be configured to receive an real image captured by image sensor device 150 (such as a camera) on the mobile device 120; detect a reference item such as a building, landmark, etc., captured in the real image; and utilize the detected reference item in the captured real image relative to the current location of the mobile device 120 as a basis to determine the directional orientation of the mobile device 120/display screen 130 in the geographical region. Thus, when the current location of the mobile device 120 is known, the orientation detection resource 195 can be configured to identify renditions of one or more known objects (items) in the geographical region to derive the orientation of the display screen 130.

In accordance with further embodiments, the orientation detection resource 195 can include appropriate circuitry (such as one or more gravity sensors) to detect an angular orientation of the mobile device 120 in three-dimensional space. In such an instance, there is no need to rely on use of captured images to detect an orientation of the mobile device 120.

Also, as its name suggests, the location detection resource 196 monitors a whereabouts of the mobile device 120 in a respective geographical region. In one embodiment, the location detection resource 196 constantly monitors a current location of the mobile device 120 in the geographical region. The location detection resource 196 forwards the location information to display management resource 140. The display manager 140 executing in the mobile device 120 (or other suitable resource) utilizes the received location information to keep track of the current location of the mobile device 120 in the geographical region.

Note that the location detection resource 196 can be or include any resources to detect the current location of the mobile device 120. In one non-limiting example embodiment, the location detection resource 196 includes or relies on use of GPS (Global Positioning System) resources to determine a current location of the mobile device 120 in the geographical region.

In accordance with further embodiments, the location of the mobile device 120 can be detected using satellite navigation systems such as GPS (used in the U.S.), Galileo (used in Europe), GLONASS (used in Russia), IRNSS (used in India), Compass (used in China), or the like. Further embodiments herein can include use of terrestrial-based location services such as LORAN, cell tower triangulation, inertial navigation services, WLAN-SSID-based approaches, WiFi™ triangulation methods, etc., to determine a location of the mobile device 120 in the geographical region.

Thus, location detection resource 195 can rely on use of any suitable location detection services or methods to produce location information for use by display management resource 140.

In accordance with one embodiment, the display management resource 140 enables the respective user 108 to play back images of an historical event that occurred in a vicinity of the location where the user and corresponding mobile device 120 currently resides.

More specifically, in one embodiment, a user 108 can select one of multiple historical events that have occurred at the current location of the mobile device 120. As a more specific example, the user 108 can provide input 105 specifying a time in history when a selected historical event occurred. In response to receiving selection of a particular historical event or time, the display manager 140 utilizes map information 170 to map the selected historical event or time to corresponding virtual image data 175 (such as still images, video images and audio, etc.) stored in repository 108. Via processing of the virtual image data 175 and generation of one or more perspective views, the display management resource 140 initiates display of a reenactment of the corresponding historical events on display screen 130 for viewing by respective user 108 of mobile device 120.

As will be discussed further in this specification, embodiments herein include producing the rendition of the historical event on display screen 130 to be from a viewing perspective as defined by the directional orientation and current location of the display screen 130 of the mobile device 120.

Just as the processing capability associated with display management resource 140 can be located in any suitable one or more resources, note that the data stored in repository 180 can be stored in any suitable location. For example, in one embodiment, the repository 180 can be located in the mobile device 120. In such an instance, the display management resource 140 performs local READ accesses to the repository 180 to retrieve appropriate portions of virtual image data 175 to assemble images (and corresponding audio) for playback on the mobile device 120.

Alternatively, the repository 108 can be disposed in a respective network 190 accessible to the mobile device 120. In this latter instance, the display management resource 140 can be configured to utilize communication interface 155 to establish respective communication link 128 (such as a wired or wireless communication link) with base station 135. The station 135 supports communications through network 190 to server resource 165. The server resource 165 accesses virtual image data 175 stored in repository 180 and transmits the retrieved data over network 190 to display management resource 140.

Network 190 can include any number of different types of networks such as the Internet, cellular phone networks, WiFi™ networks, etc.

In yet further embodiments, note that virtual image data 175 can be stored in multiple locations. For example, a first portion of the virtual image data 175 can be stored locally in mobile device 120; a second portion of virtual image data 175 can be remotely stored in repository 180, and so on. In such an instance, the display management resource 140 performs appropriate local and remote accesses to retrieve appropriate portions of the virtual image data 175 to generate images for display on display screen 130.

As previously discussed, as further discussed below, the display management resource 140 receives location information and orientation information from location detection resource 196 and orientation detection resource 195. Depending on the location and orientation of the display screen 130, the display management resource 140 initiates display of a rendition of content such as an historical event from different perspectives. In one non-limiting example embodiment, the rendition of the historical event displayed on the display screen 130 of the mobile device 120 is a reenactment of a historical event that occurred in a vicinity of the location in the past. As an example, a user using the mobile device 120 in the year 2014 can utilize the display screen 120 as window into the past to view events that occurred in the year 1905. Thus, the user 108 can utilize the mobile device 120 and corresponding display screen 130 to view virtual images of a reenactment of a historical even that occurred minutes, days, years, etc., ago with respect to the current time. To provide a more realistic reenactment to the user 108, the rendition of the historical event derived from virtual image data 175 can include one or more actual images of the historical event.

Figure 2:
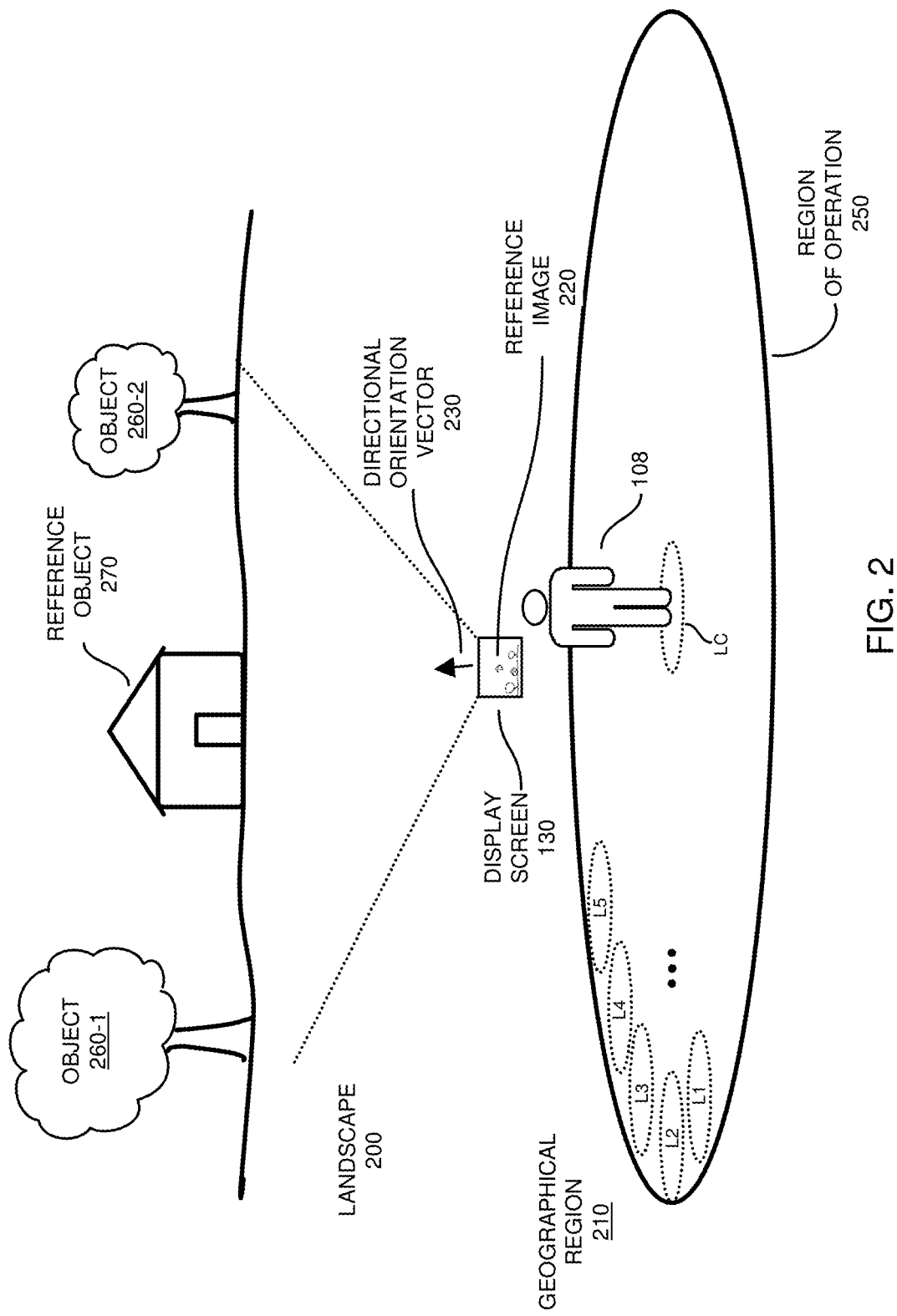
FIG. 2 is an example diagram illustrating use of a mobile device and corresponding display screen in a geographical region according to embodiments herein.

FIG. 2 is an example diagram illustrating use and calibration of a mobile device in a geographical region according to embodiments herein.

Embodiments herein can include calibrating an orientation of the mobile device 120 to a reference.

As shown in this example, landscape 200 in geographical region 210 includes object 260-1 (such as tree), object 260-2 (such as a landmark), reference object 270 (such as tree), etc. The user 108 operates mobile device 120 in region of operation 250 including multiple locations where the user can stand to view the landscape 200. In this example embodiment, region of operation 250 includes multiple different locations (L1, L2, L3, L4, L5, etc.) where the user 108 can stand. In this instance, assume that the user 108 and corresponding mobile device 120 are disposed at location, LC (such as a center location of region of operation 250).

To calibrate an orientation of the mobile device 120 in the geographical region including landscape 200, the display management resource initiates display of a reference image at a fixed location on display screen 130 (as shown in FIG. 3). As discussed below, the user 108 points image sensor device 150 on a front facing of the mobile device 120 to capture landscape 200 and corresponding objects. Display management resource 140 receives the signals produced by the image sensor device 150 and initiates display of a respective rendition of the objects on display screen 130 depending on the particular direction that the image sensor device 150 is pointed. The display management resource 140 can be configured to initiate display of reference image 220 (such as cross-hairs on a scope, silhouette or outline of a landmark=, etc.) at a fixed location on display screen 130.

FIG. 3 is an example diagram illustrating calibration of a mobile device according to embodiments herein.

To calibrate an angular orientation of the display screen 130 and corresponding mobile device 120 in physical three-dimensional space, the display management resource 140 initiates display of image information captured by a camera disposed on a front facing of the mobile device 120. As a user 108 changes an angular orientation of the display screen, the image sensor device 150 displays the detected real captured images (e.g., objects such as object 260-1, object 260-2, reference object 270, etc.) on display screen 130.

The display screen 130 displays real-time images captured by image sensor device 150. Because the display management resource 140 displays current captured images on display screen 130, the rendition of the corresponding objects on display screen 130 moves about display screen 130 as the user 108 adjusts the angular orientation of the display screen 130.

To perform the calibration, the user 108 adjusts an angular orientation of the mobile device 120 such that the reference image 220 aligns with the rendition of the reference object 270-R as captured by the image sensor device 150. The display management resource 140 continuously receives updated orientation input from orientation detection resource 195. At a time when the reference image 220 and rendition of the reference object 270-R are aligned, the display management resource 140 defines the corresponding angular orientation of the mobile device 120 to be a reference orientation such as zero degrees. This calibration enables the display management resource 140 to precisely know an angular orientation of the mobile device 120 at subsequent times of use. The orientation information generated by the orientation detection resource 195 indicates an angular orientation of the mobile device 120 and/or corresponding display screen 130 with respect to the reference object 270 in the physical three-dimensional space. I As will be discussed later in this specification, the display management resource 140 will use the orientation information produced by the orientation detection resource 195 to map the orientation of the mobile device 120 to virtual images defined in a three-dimensional space. That is, in one non-limiting example embodiment, instead of displaying images captured by the image sensor device 150, the display management resource 140 initiates display of virtual images derived from a three-dimensional virtual image space.

Figure 4:
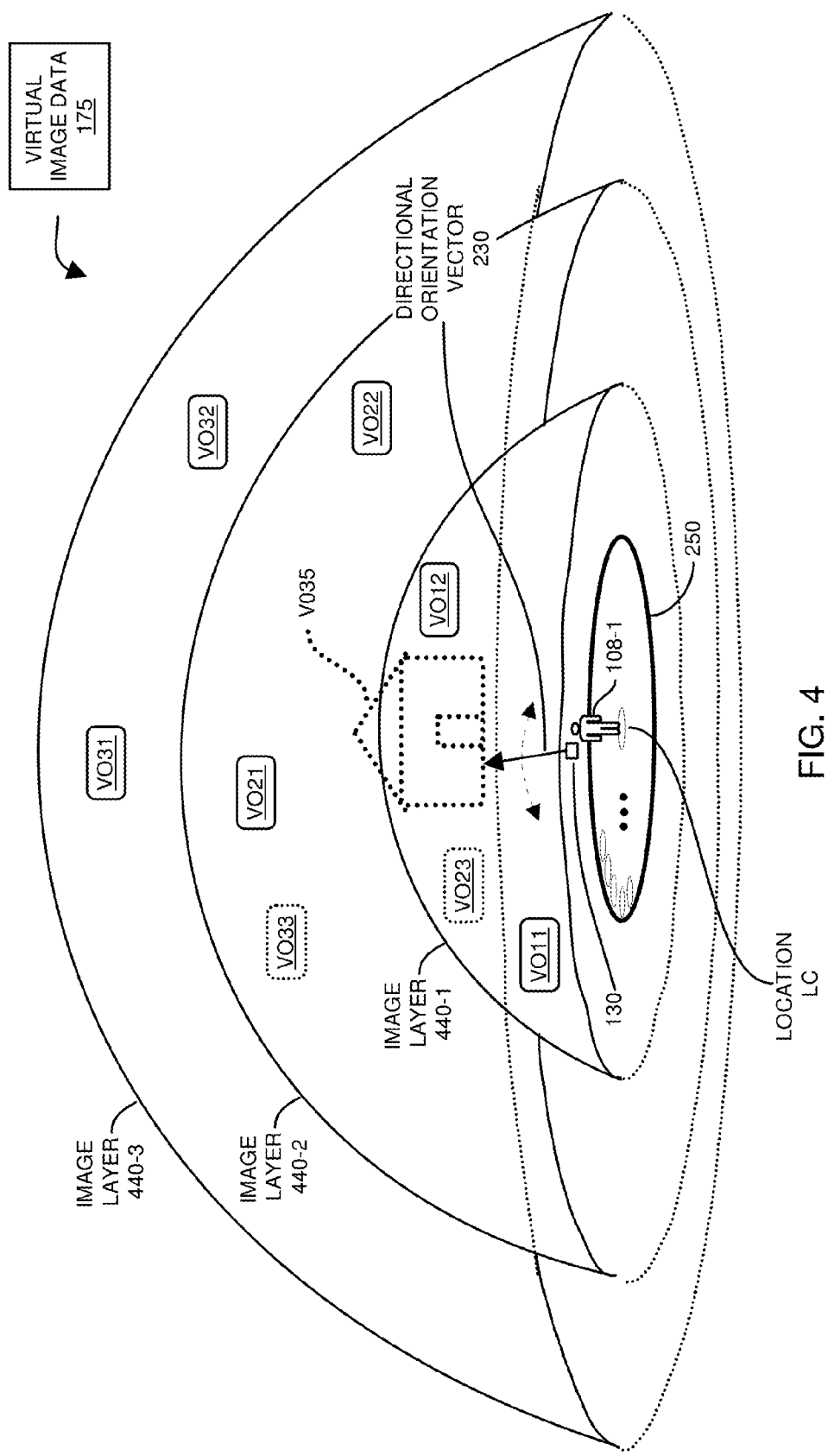
FIG. 4 is an example three-dimensional diagram illustrating multiple image layers of virtual objects in a virtual three-dimensional space according to embodiments herein.

FIG. 4 is an example diagram illustrating multiple image layers including respective virtual objects in a three-dimensional virtual image space according to embodiments herein.

As shown, virtual image data 175 defines images (still or moving) of one or more virtual objects at multiple different image layers 440 in a three-dimensional virtual image space. The three-dimensional virtual image space (such as based on an historical event) corresponds in location to the actual physical three-dimensional space in geographical region 210. Assume that the virtual object VO35 (at least location wise) corresponds to the reference object 270 (such as a landmark) in physical reality of geographical region 210.

In this example embodiment, the first image layer 440-1 includes a first set of virtual objects such as virtual object VO11, virtual object VO12, etc., which are located nearest to user 108 in the three-dimensional virtual image space; the second image layer 440-2 includes a second set of virtual objects including virtual objects VO21, VO22, VO23, etc., which are located next further out from user 108 in the three-dimensional virtual image space; the third image layer 440-3 includes a third set of virtual objects VO21, VO22, VO23, VO35, etc., which are located next further out from user 108 in the three-dimensional virtual image space; and so on.

In one non-limiting example embodiment, each of the layers represents a virtual dome. Thus, virtual image data 175 can define domes of virtual objects present in virtual three-dimensional space corresponding to the users physical space.

Each of the image layers 440 can represent objects within a range of distance from the centroid location LC. By way of non-limiting example, the first image layer 440-1 includes virtual objects residing within a first range or distance band such as a distance band between 10 and 30 feet away from location LC. In such an instance, each of the virtual objects VO11, VO12, etc., appear to reside within 10 and 30 feet from location LC. The second image layer 440-2 includes virtual objects residing within a second range or distance band such as a distance band between 30 and 150 feet away from location LC. In such an instance, each of the virtual objects VO21, VO22, etc., appear to reside within 30 and 150 feet from location LC. The third image layer 440-3 includes virtual objects residing within a third range or distance band such as a distance band between 150 and 1000 feet away from location LC. In such an instance, each of the virtual objects VO31, VO32, etc., appear to reside within 150 and 1000 feet from location LC.

Thus, the first image layer 440-1 can be configured to define a first set of virtual objects residing within a first distance band with respect to the location; the second image layer 440-2 can be configured to define a second set of virtual objects residing within a second distance band; the third image layer 440-3 can be configured to define a third set of virtual objects residing within a third distance band; and so on.

In accordance with further embodiments, each of the virtual objects in a layer is defined by one or more display elements (such as pixels). Any suitable resolution can be used to define the virtual images and/or virtual objects disposed in the different layers.

Each of the different image layers 440 can define moving pictures such as video images. In such an instance, the virtual image data 175 defines settings of the display elements (such as pixels) in each of the image layers 440 over time. Thus, the virtual image data 175 can be configured to define a virtual three-dimensional space.

As previously discussed, the user 108 operates the mobile device 120 and corresponding display screen 130 as a window to view virtual objects in the different image layers 440. The display management resource 140 utilizes the directional orientation vector 230 (to determine an orientation) of the mobile device 120 to define a viewing window through each of the virtual image layers 440. Depending on the angular orientation of the mobile device 120, the display management resource 140 initiates display of a window of different sets of one or more virtual objects for viewing by user 108 on display screen 130.

As a more specific example, the orientation detection resource 195 can be configured to constantly provide display management resource 140 an update of the mobile device's current orientation. The orientation is defined by directional orientation vector 230. The display management resource 140 utilizes the directional orientation vector 230 to derive the rendition of images (potentially from a selected historical event) to be displayed on display screen 130 for viewing by user 108. The display management resource 140 uses the directional orientation vector 230 to identify which of the virtual objects (at different distances from the user 108) in the different image layers 440 are to be used to produce a respective image on display screen 130. The display management resource 140 dynamically displays a rendition of virtual images of the historical event on the display screen 130 from a viewing perspective of the directional orientation of the mobile device 120.

By panning the mobile device 120 (such as changing its angular orientation in physical space), the user 108 is able to view different portions of the historical event on the display screen 130 in accordance with a panning motion of the mobile device. As further described herein, the panning motion of the mobile device 120 (and corresponding image sensor device 150) enables the user 108 to view different actions associated with the historical event that occur at different angular directions with respect to the user's current location. In certain instances, in addition to panning, the user 108 of the mobile device 120 may move from one location to another in the region of operation 250. Based on the orientation and location of the mobile device 120, the display management resource 140 provides updates perspective view of the virtual three-dimensional space for viewing by respective user 108 on display screen 130.

Note that further embodiments herein can include utilizing real-time or pseudo real-time captured images as a basis for a respective background as opposed to pre-recorded virtual images derived from the furthest image layer (such as image layer 440-3) as the background. In such an instance, one or more image layers such as image layers 440-1 and 440-2 represent pre-recorded content that is superimposed onto a background image (real-time captured images). In a manner as previously discussed, the image layers 440-1 and 440-2 capture movement of virtual objects (such as people, animals, etc.) in a three-dimensional virtual space. The virtual images as defined by the image layers 440-1, 440-2, etc., represent virtual objects that are superimposed over the real-time captured background.

In accordance with yet further embodiments, the user's viewing experience can be interactive or conditional. For example, one or more image layers can be configured to capture an historical event such as a person (such as Paul Revere) riding a horse down a path. The virtual events displayed on display screen 130 are conditional. For example, the display management resource 140 can be configured to monitor input such as a voice of user 108. If the display management resource 140 detects that the user 108 utters a phrase such as "HI" or "STOP," the display management resource 140 selects a rendition of video in virtual image data in which the horse stops, enabling the rider of the horse to engage speaking with the user 108. Alternatively, if the user 108 is silent (e.g., the user 108 does not utter an attention grabbing phrase) as the rider of the horse approaches, the display management resource 140 alternative detects this condition and selects playback of virtual image data in which the rider of the horse continues riding past the user 108 without stopping. Accordingly, in one embodiment, the (virtual) historical events played back on the display screen 130 can vary depending on further input from the user 108.

In accordance with further embodiments, using light coding techniques, the display management resource 140 can be configured to match the vectors in: a photorealistic, 180 degree-image-dome-composite of images (a version of image layers 440). The image layers 440 can be made up of three or more 1080p output resolution background plates and three or more layers of live action assets, such as actors and cars, filmed against a green screen and three or more layers of three dimensional computer generated image assets, to: existing landmarks in the user's location, such as buildings, streets and sidewalks.

As the user 108 moves, the location detection resource 196 and orientation detection resource 195 in the mobile device 120 rotate and shift on X, Y, and Z axis all of the nine or more layers of video, photo and CGI assets, keeping both virtual and actual landmark positions, over-laid (geographically-registered) from the user's perspective, looking through the display screen 130 of the mobile device 120 and beyond it, to the actual landscape. The display screen 130 of the mobile device 120 then becomes a seamless window into a matching world that appears to be a parallel universe. So, as the user 108 moves within a limited space and turns around three hundred and sixty degrees, the user 108 experiences the illusion that he or she is looking through a window into another world that is exactly over-laid (such as geographically-registered) with his or her own physical world.

In the context of certain embodiments herein, historic scenes can be filmed and finished using the above technique to create a window into the past and an apparent view of the user's surroundings, from long ago. This synchronous parallel universe, that is, a WINDOW TO ANOTHER WORLD can be created when the light coding data collected from the user's mobile device of the user's surroundings is matched to tracking marks (and filmed land marks) in the live-action, video-composite, virtual dome (such as image layers 440).

In accordance with still further embodiments, assets can be downloaded via any suitable wireless communication link such as from a WiFi™ hotspot or pre-loaded onto the mobile device 120 with download media packages that accompany the display management resource 140. Eventually, as wireless bandwidth increases and becomes more available to a respective user 108 to receive display information, neither of the above asset delivery methods may be necessary as all assets could potentially be downloaded to and uploaded from the mobile device 120 via digital a wireless communication link such as a cellular wireless signal, WiFi™ link, etc.

Using a light-coding, infrared strobe on the face-side of the mobile device 120 as well as on the back-side of the mobile device 120, the user 108 can enter the environment as a CG avatar and interact with the avatars of other users, who may be experiencing the environment in a Virtual Reality suit and Oculus Rift goggles or similar immersive interfaces. In one embodiment, if other people in the same geographical region are holding up their mobile devices and experiencing an historical event as described herein, each user can see the other users as custom-chosen characters from that time period.

In yet further embodiments, users would have the ability to interact with each other as well as potentially interact (in limited ways) with the live-action actors, vehicles and other assets in the historical recreation. The user 108 will have a specific radius (such as region of operation 250) in which he or she is able to move about within the virtual world. The size of region of operation 250 can be determined by the user-perceived parallax authenticity parameters of the video dome composite (image layers 440).

Additionally, note that as processor power in mobile devices grows, image layers can be added to the video dome composite (image layers 440). The greater number of layers 440 associated with virtual image data 170 to support more complex parallax shift views that are rendered in real-time on respective mobile devices. If there is more than one user present with a mobile device in the immediate geographic area, processing can be distributed amongst the mobile devices via a wireless communication link such as WiFi™, cellular digital, etc., across available devices, so all users within a given geographical region, experience the immersive re-creation, with parallax shift renders running at the same speed across every device. In other words, their experiences are in sync, so if one user looks at the device of another user which happens to be pointed in a different direction, the user could observe an asset on the screen of device B, that travels in a life-like, believable way to device A.

Yet further, multiple WINDOWS (mobile devices), increasing in number, will theoretically create a video dome within the virtual video dome and a malleable and potentially amorphous view of the entire parallel world of the historical or other recreation.

Multiple user experiences could take place anywhere that vehicular traffic or other risk-to-life elements are not present. For example, in a large park that long ago was farm land, users could see and interact with avatars (selected characters) of each other and investigate and explore different facets of a scripted story, being played out by actors who are elements in the immersive re-creation. As an example, ten different users could experience the scripted story in ten different ways, while being completely immersed in the world of the narrative, which is taking place around them, complete with sets, actors, props and sounds.

Re-creation zones (such as region of operation 250) can include strategically placed sources of re-created smells from the period depicted in the immersive, interactive experience. In such an instance, users would see, hear and to some small degree, smell the environment from long ago, brought to life around them.

As further described herein, using a front-camera-light-coding sensor and the camera itself, the display management resource 140 in the mobile device 120 can be configured to create a real-time single or multiple frame composite of the user and the environment, thus allowing the user to take a "selfie" picture, while time traveling through our augmented reality app, into the past.

Figure 5:
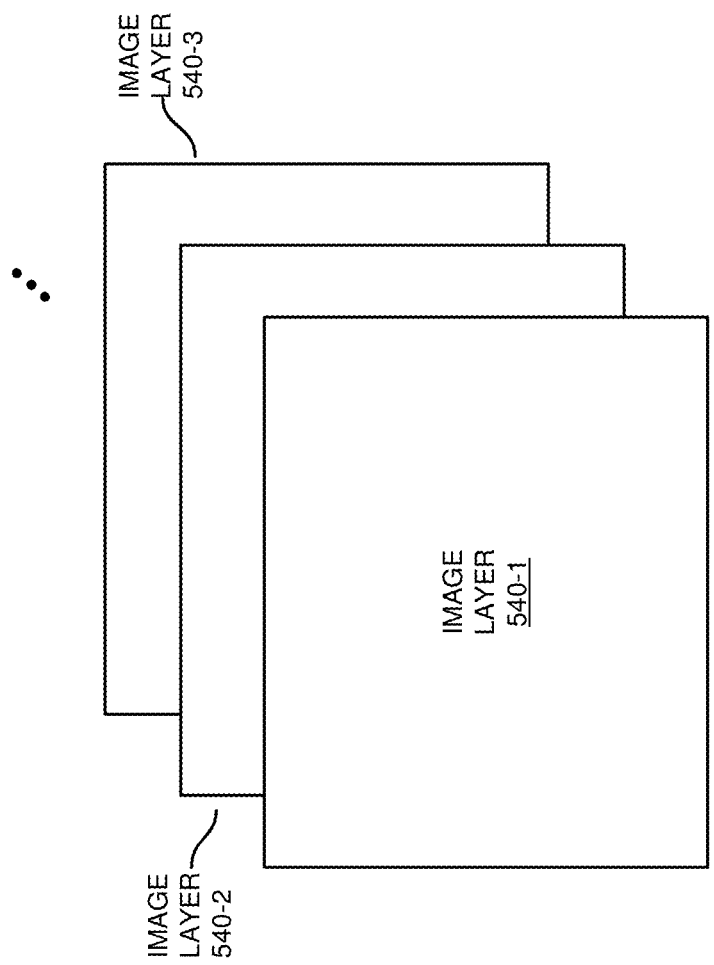
FIG. 5 is an example diagram illustrating multiple virtual image layers according to embodiments herein.

FIG. 5 is an example diagram illustrating multiple image layers of virtual objects according to embodiments herein.

Note that as an alternative to producing the virtual image space such as domes, embodiments herein can include producing planes of virtual image layers 540-1, 540-2, 540-3, etc. In a similar manner as previously discussed, each of the virtual image layers 540 can define objects at different distances from the user's current location. For example, the image layer 540-1 can include virtual objects present between 10 and 30 feet away from a user, the image layer 540-2 can include virtual objects present between 30 and 150 feet away from a user, the image layer 540-3 can include virtual objects present between 150 and 1000 feet away from a user, and so on.

Figure 6:
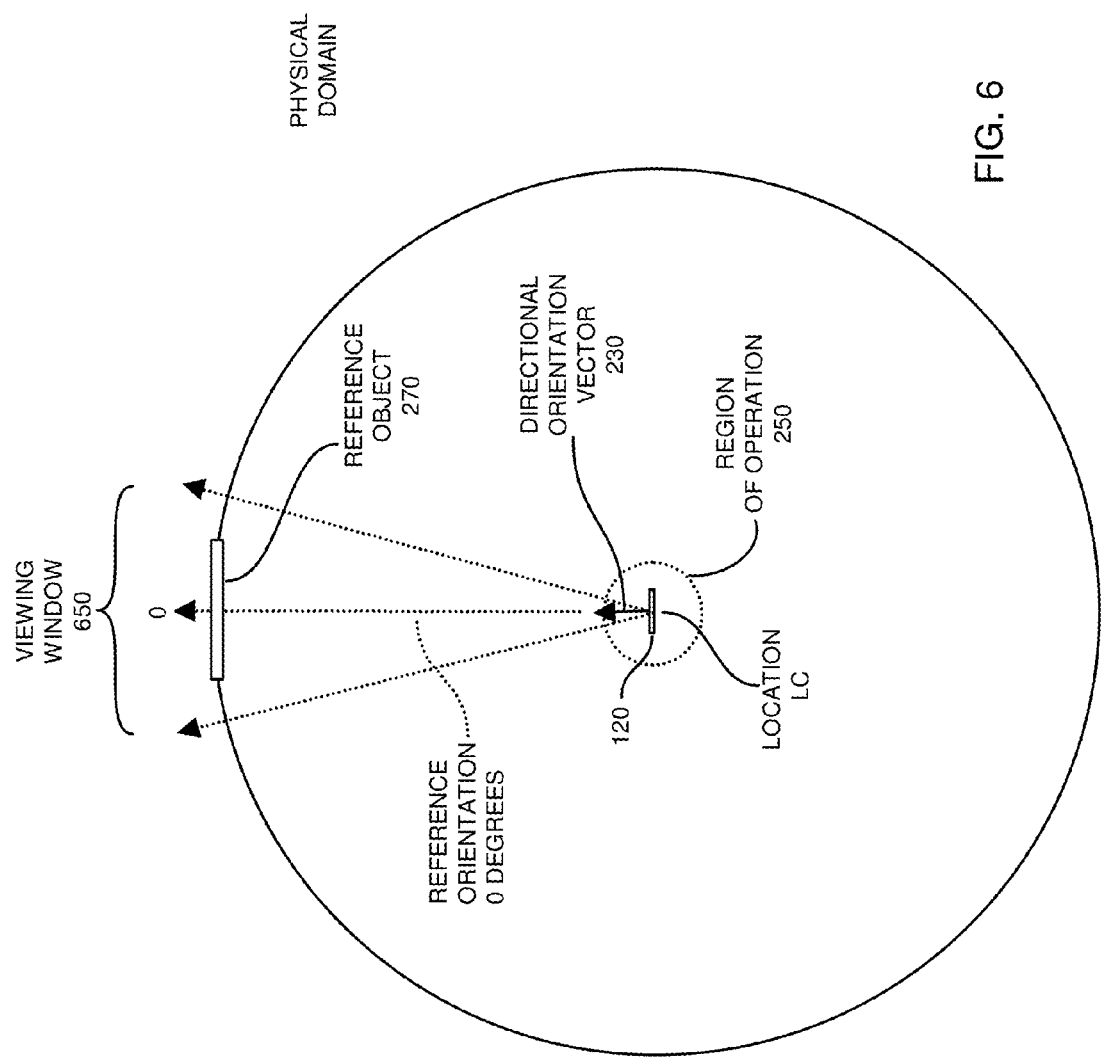
FIG. 6 is an example top-view diagram illustrating a first location and first orientation of a mobile device in a physical domain according to embodiments herein.

FIG. 6 is an example top-view diagram illustrating a mobile device located at a first location and oriented in a first orientation in a physical domain according to embodiments herein.

As shown, assume in this example that the display management resource 140 receives location information from location detection resource 196 indicating that the mobile device 120 is located at location LC in geographical region 210. The display management resource 140 also receives a vector 230 from orientation detection resource 195 indicating the orientation of the display screen 130 and corresponding image sensor device 150.

The display management resource 140 utilizes the vector 230 to define a viewing window 650 for creating a virtual image for display on display screen 130. In reality, the actual viewing window 650 associated with corresponding image sensor device 150 captures a view of reference object 270 and respective surroundings in the geographical region 210. However, as further shown in the following FIG. 7, based on the current location and orientation of the mobile device 120, the display management resource 140 produces a virtual viewing window through each of one or more virtual image layers to produce a viewable rendition of content for display on display screen 130. As previously discussed, the images displayed on display screen 130 can be completely or only partially virtual.

Figure 7:
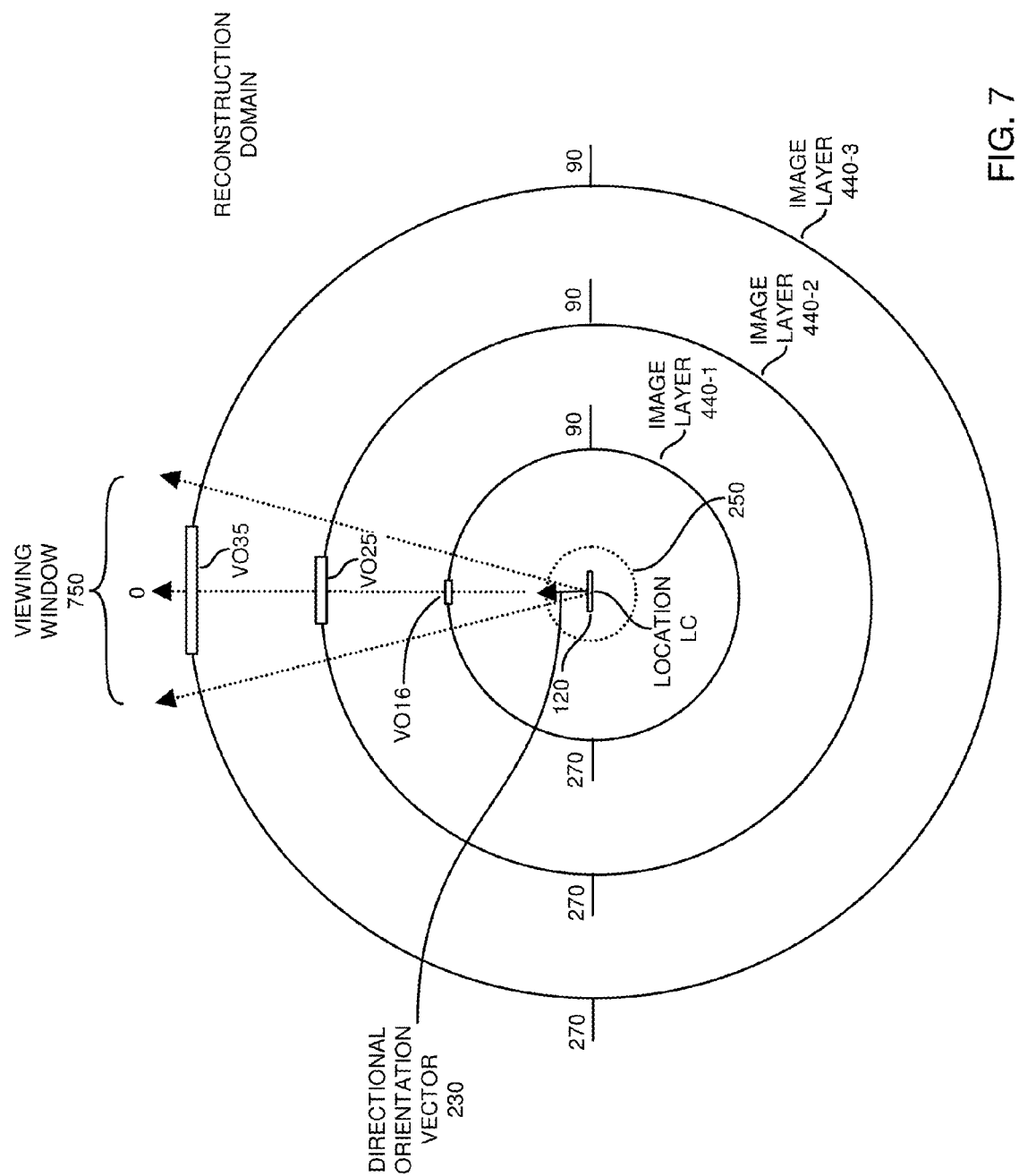
FIG. 7 is an example diagram illustrating construction of a virtual image from a perspective of the first location and the first orientation of a mobile device according to embodiments herein.

More specifically, FIG. 7 is an example diagram illustrating construction of a virtual image in accordance with the first location and the first orientation of a mobile device according to embodiments herein.

As shown, in the virtual reconstruction domain, the display management resource 140 utilizes virtual viewing window 750 (corresponding to the actual viewing window 650 or view as defined by image sensor device 150) as a basis to determine which if any virtual objects present in the different image layers 440 of the virtual image three-dimensional space are to be displayed on corresponding display screen 130 for viewing by user 108.

In this instance, when the user points the image sensor device 150 of the mobile device 120 towards reference object 270 (the reference point), the display management resource processes virtual image data 175. Assume that during processing, the display management resource 140 detects that virtual object VO16 resides in the virtual viewing window 750 in image layer 440-1; the display management resource 140 detects that virtual object VO25 resides in the virtual viewing window 750 in image layer 440-2; the display management resource 140 detects that virtual object VO35 (rendition of reference object 270) resides in virtual viewing window 750 in image layer 440-3.

When producing a respective image for display on display screen 130, the display management resource 140 gives precedence to any virtual objects in the nearest image layers 440 because they would occlude a view of virtual objects disposed at further distances from the user's current location. For example, as further shown in FIG. 8, virtual object VO16 (circle) detects in image layer 440-1 is displayed as being in front of virtual objects VO25 (square) and VO35 (landmark); virtual object VO25 (square) detected in image layer 440-2 is displayed as being in front of virtual object virtual object VO35 (landmark).

Accordingly, the display management resource 140 initiates display of the rendition of virtual object VO16 (circle) in front of the rendition of virtual object virtual object VO25 (square). The display management resource 140 displays the rendition of the virtual object VO25 (square) in front the rendition of virtual object VO35 (building).

As previously discussed, note again that the viewable rendition (virtual images) displayed on display screen 130 can be represent an historical event that occurred at the geographical region in the past; each of the image layers 440 include virtual objects associated with the historical event.

In one embodiment, the display management resource can be configured to display a portion of virtual images derived from virtual image data 175 as well as real images captured by a respective image sensor device of the mobile device 120. For example, as previously discussed, the mobile device 120 can be configured to include a image sensor device to capture images of a user 108 viewing display screen 130. Embodiments herein can include detecting the user 108 and overlaying an image of the user 108 onto the virtual image shown on the display screen 130 in FIG. 8.

Figure 9:
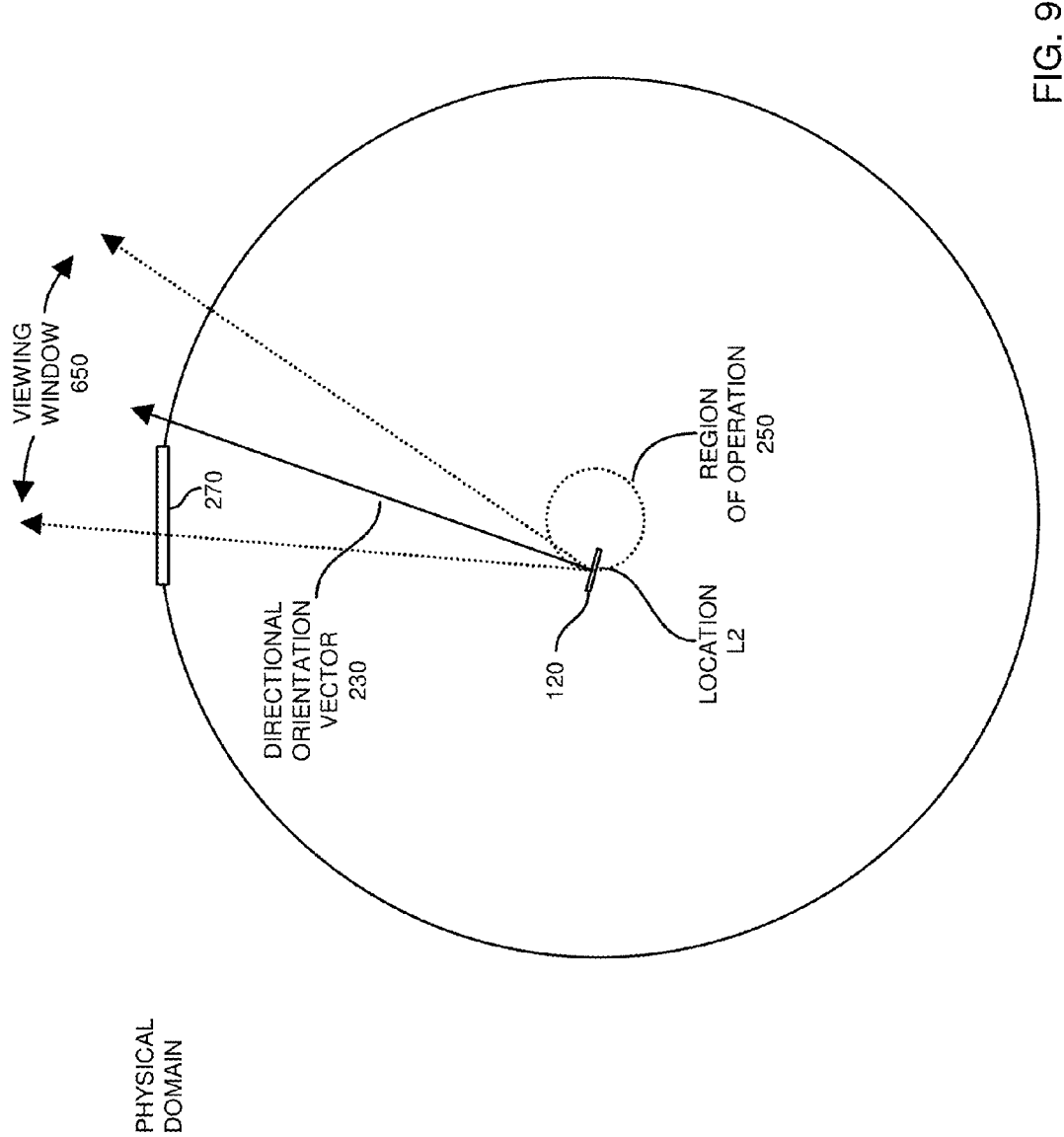
FIG. 9 is an example top-view diagram illustrating a second location and second orientation of a mobile device in a physical domain according to embodiments herein.

FIG. 9 is an example top-view diagram illustrating a mobile device located at a second location and oriented in a second orientation in a physical domain according to embodiments herein.

In this example, assume that the user 108 operating the mobile device 120 physically moves from location LC to location L2 in region of operation 250. The location detection resource 196 detects this condition and notifies display management resource 140 that the mobile device 120 is now located at location L2 instead of location LC. Assume further that the user 108 changes an orientation of the mobile device 120 to a new direction as shown. The display management resource 140 receives a directional orientation vector 230 indicating the new orientation of mobile device 120.

In a manner as previously discussed, the display management resource 140 utilizes the vector 230 to define a viewing window 650 for creating a virtual image from virtual image data 175. As shown in FIG. 9, in reality, the actual viewing window 650 associated with corresponding image sensor device 150 (if activated) captures a partial view of reference object 270 (represented by virtual object VO35) and respective surroundings in the geographical region 210. In this example, the image sensor device 150 of mobile device 120 is pointed to a location to the right of the reference object 270 in the geographical region 210.

As further shown in the following FIG. 10, to account for the change in location and orientation of the mobile device 120 to the second location and second orientation, the display management resource 140 produces a virtual image from the perspective of the viewing window 750 (corresponding to viewing window 650) in FIG. 10. In such an instance, virtual viewing window 750 captures virtual objects in each of one or more virtual image layers to produce a viewable rendition of images for display on display screen 130. Thus, FIG. 10 shows the virtual image that should be created for display on display screen 130.

Figure 10:
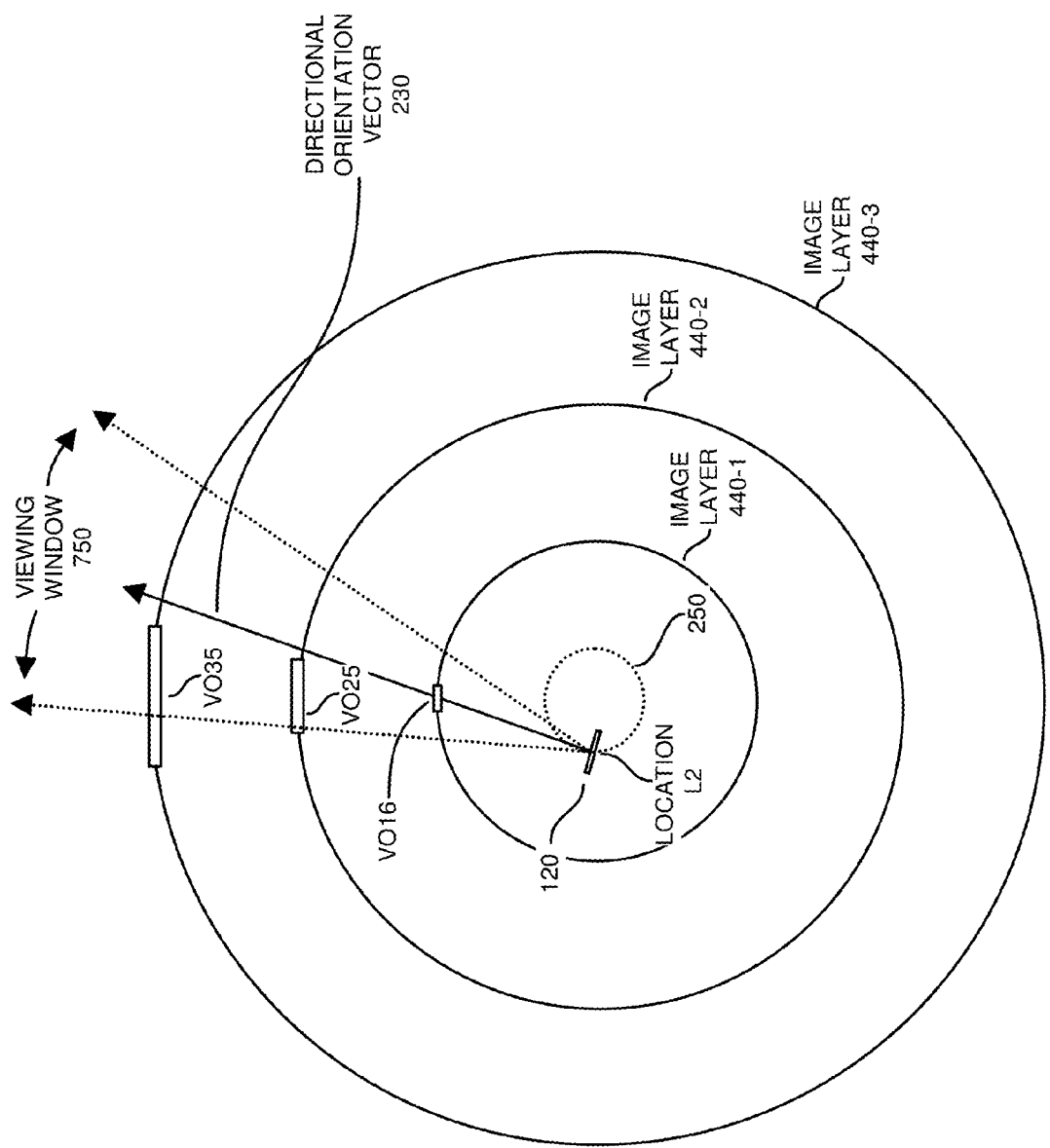
FIG. 10 is an example top-view diagram illustrating angular viewing of virtual objects from the second location and second orientation according to embodiments herein.
Figure 11:
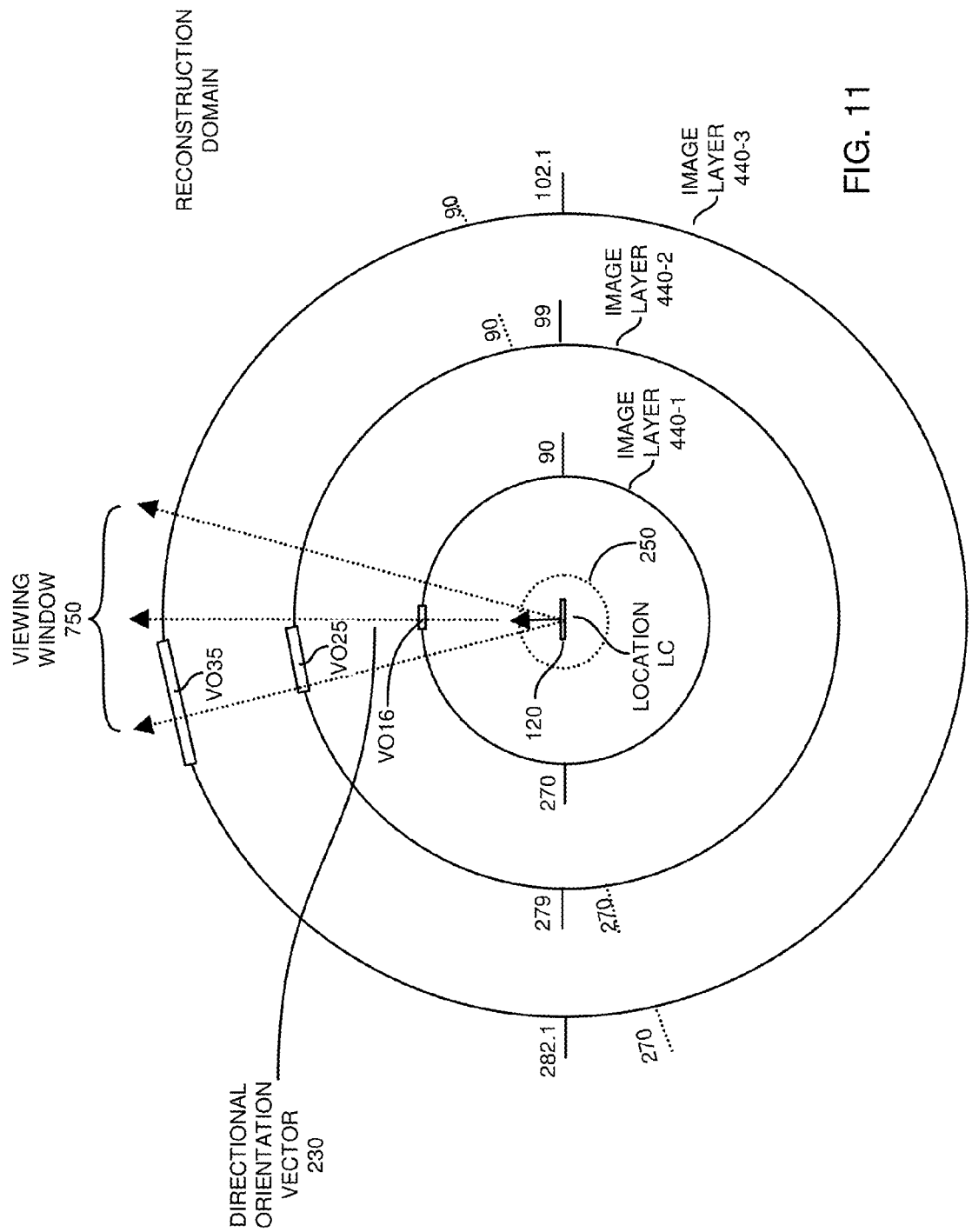
FIG. 11 is an example top-view diagram illustrating construction of a virtual image from a perspective of the second location and the second orientation of a mobile device according to embodiments herein.

Rather than performing complex processing of virtual image data 175 with respect to location L2 and corresponding second orientation as shown in FIG. 10, embodiments herein include producing a respective virtual image for the mobile device 120 at the second location and second orientation using the technique shown in FIG. 11. As shown in FIG. 11, the display management resource 140 assumes the mobile device 120 is located at the location LC. However, the display management resource 140 rotationally offsets one or more of the image layers 440 to produce a corresponding virtual image for display on display screen 130.

In other words, based on detecting the second location and second orientation, the display management resource 140 detects that the mobile device 120 is pointed at virtual object VO16 in layer 440-1 as shown in FIG. 11. Assume that location L2 is 10 feet from location LC and that the angular view of mobile device 120 is oriented or turned to be clockwise by 18.43 degrees with respect to the reference orientation of 0 degrees. Assume further that image layer 440-1 represents a layer of virtual objects 30 feet from location LC; image layer 440-2 represents a layer of virtual objects 60 feet from location LC; image layer 440-3 represents a layer of virtual objects 90 feet from location LC; and so on. In such an instance, virtual object VO16 becomes the center of the virtual image to be displayed on display screen 130. Applying trigonometry (such as in related U.S. Provisional Patent Application Ser. No. 62/006,581 entitled "Parallax Equations for Use in Mobile Devices") to the second location and second orientation information, the display management resource 140 rotates an original orientation of the image layer 440-2 by approximately 9 degrees counterclockwise; the display management resource 140 rotates the original orientation of image layer 440-3 clockwise by approximately 12.1 degrees in order to create an appropriate virtual image for the second location and second orientation. There is no need to rotationally offset layer image layer 440-1 because the center of viewing window 750 points directly at virtual object VO16.

As shown, the rotation of the one or more virtual image layers 440 makes it possible for the display management resource 140 to produce a virtual image from the perspective of the mobile device 120 at the location LC and corresponding orientation even though the mobile device 120 is located at location L2.

Figure 12:
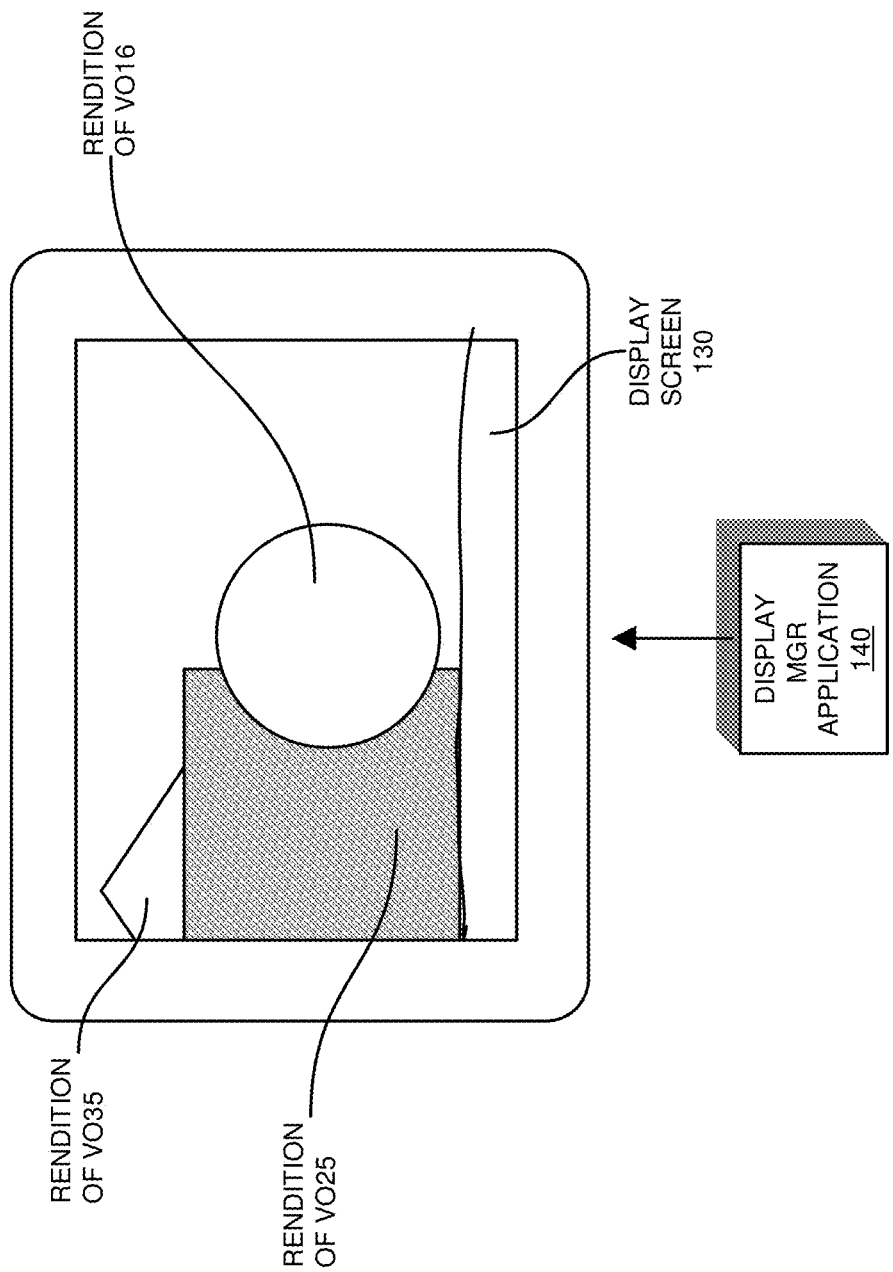
FIG. 12 is an example diagram illustrating display of a perspective view of a virtual image derived for the second location and second orientation of the mobile device according to embodiments herein.

Subsequent to applying the rotational offset to one or more image layers 440 based on the user's current location and orientation, in a similar manner as previously discussed, the display management resource 140 identifies which of the virtual objects resides in the viewing window 750 from the perspective of location LC (instead of location L2) and produces the corresponding virtual image as shown in FIG. 12. Because the user 108 has moved to the second location and changed the orientation of the mobile device 120, the display management resource 140 displays a different view from the virtual three-dimensional space as defined by virtual image data 175.

In accordance with further embodiments herein, when a user 108 changes a location and orientation of the mobile device 120, the display management resource 140 constantly and quickly provides the user 108 with a proper parallax view of the virtual window even though the virtual image data 175 is taken from the perspective of a viewer at a single point (such as location LC). In other words, as previously discussed, the amount of rotation of the one or more image layers 440 depends on the current angular orientation and location of the mobile device 120. The simulated virtual view derived from offsetting one or more image layers 440 gives the user 108 different perspective views in a three-dimensional space as a user moves from one location to another and/or changes an orientation of the mobile device 120.

Accordingly, embodiments herein include detecting movement of the mobile device 120 from a first location (such as location LC) to a second location (such as location L2). Depending on the orientation and/or location of the of the display screen 130 mobile device 120 at the second location, the display management resource 140 one or more offsets the multiple image layers 140 in a direction substantially orthogonal to the direction of viewing to derive a rendition of a virtual event (such as a historical event) for display on the display screen while at the second location, L2. The parallax view on of real-time and/or virtual objects on display screen 130 enables the user 108 to peer around objects. For example, because the user 108 moved to new location L2, the user 108 is able to view around a rendition of virtual object VO16 to get a better view of the rendition of virtual object VO25.

In addition to providing different parallax views, embodiments herein can include providing a user 108 adjusting respective views depending on movement of a respective mobile device 120 closer or further away from a respective virtual object. For example, the user 108 operating mobile device 120 can move 10 or more feet closer to the landscape 200 in FIG. 2. In such an instance, because the display management resource 140 detects movement closer to reference object 270, the display management resource 140 applies appropriate magnification to the virtual objects and displays them on display screen 130 for viewing. Accordingly, as the user 108 and corresponding mobile device 120 move closer to reference object 270, the images of corresponding virtual objects are magnified a proportional amount to accommodate the movement. Conversely, the display management resource 140 reduces the size of respective virtual objects in the display screen 130 when the user 108 moves further away from the landscape 200.

Figure 13:
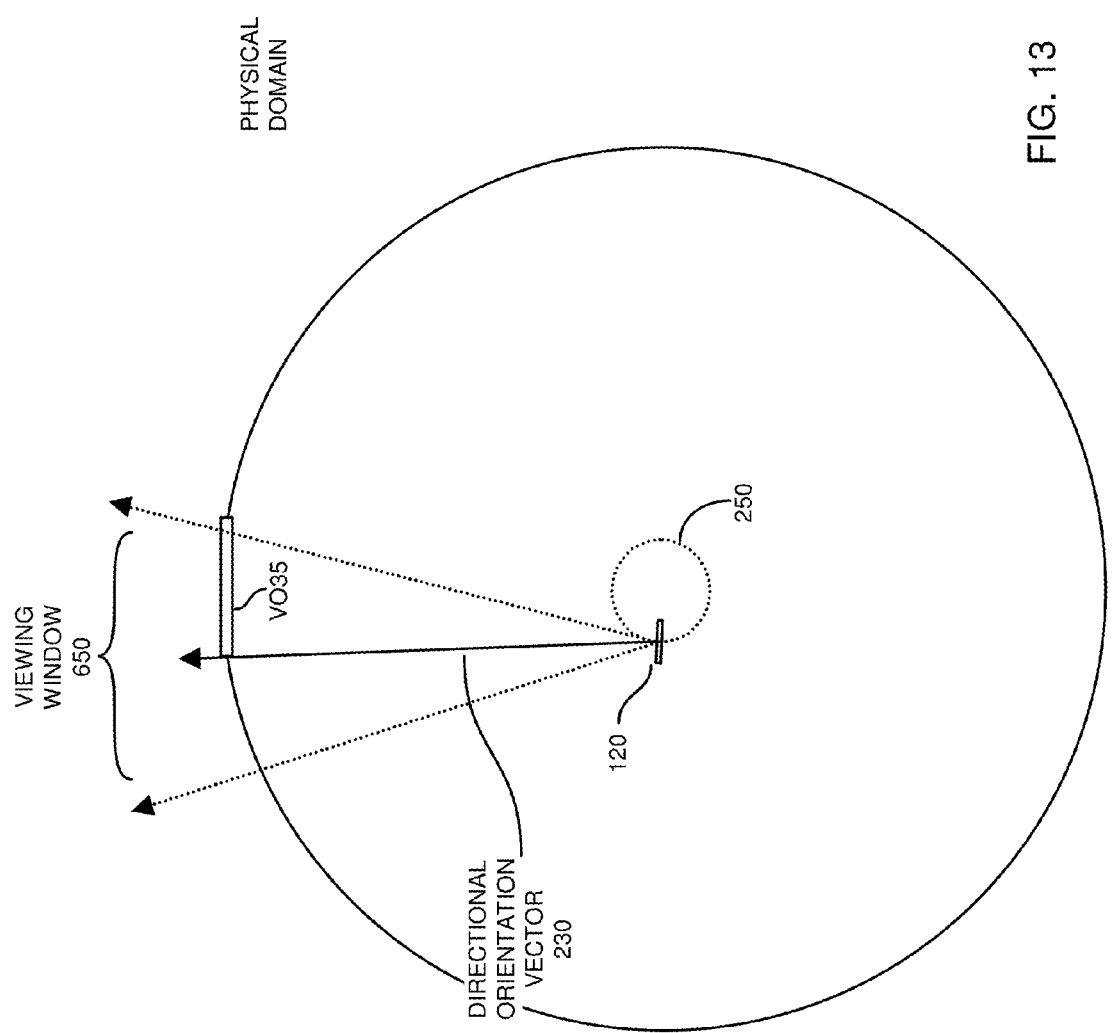
FIG. 13 is an example top-view diagram illustrating a third location and third orientation of a mobile device in a physical domain according to embodiments herein.

FIG. 13 is an example top-view diagram illustrating a mobile device located at a third location and oriented in a third orientation in a physical domain according to embodiments herein.

In this example, assume that the user 108 operating the mobile device 120 is physically located at location L2 in region of operation 250. The location detection resource 196 detects this condition and notifies display management resource 140 that the mobile device 120 is located at location L2. Assume further that the user 108 changes an orientation of the mobile device 120 to a new direction as shown. The display management resource 140 receives a directional orientation vector 230 indicating the new orientation of mobile device 120.

Figure 8:
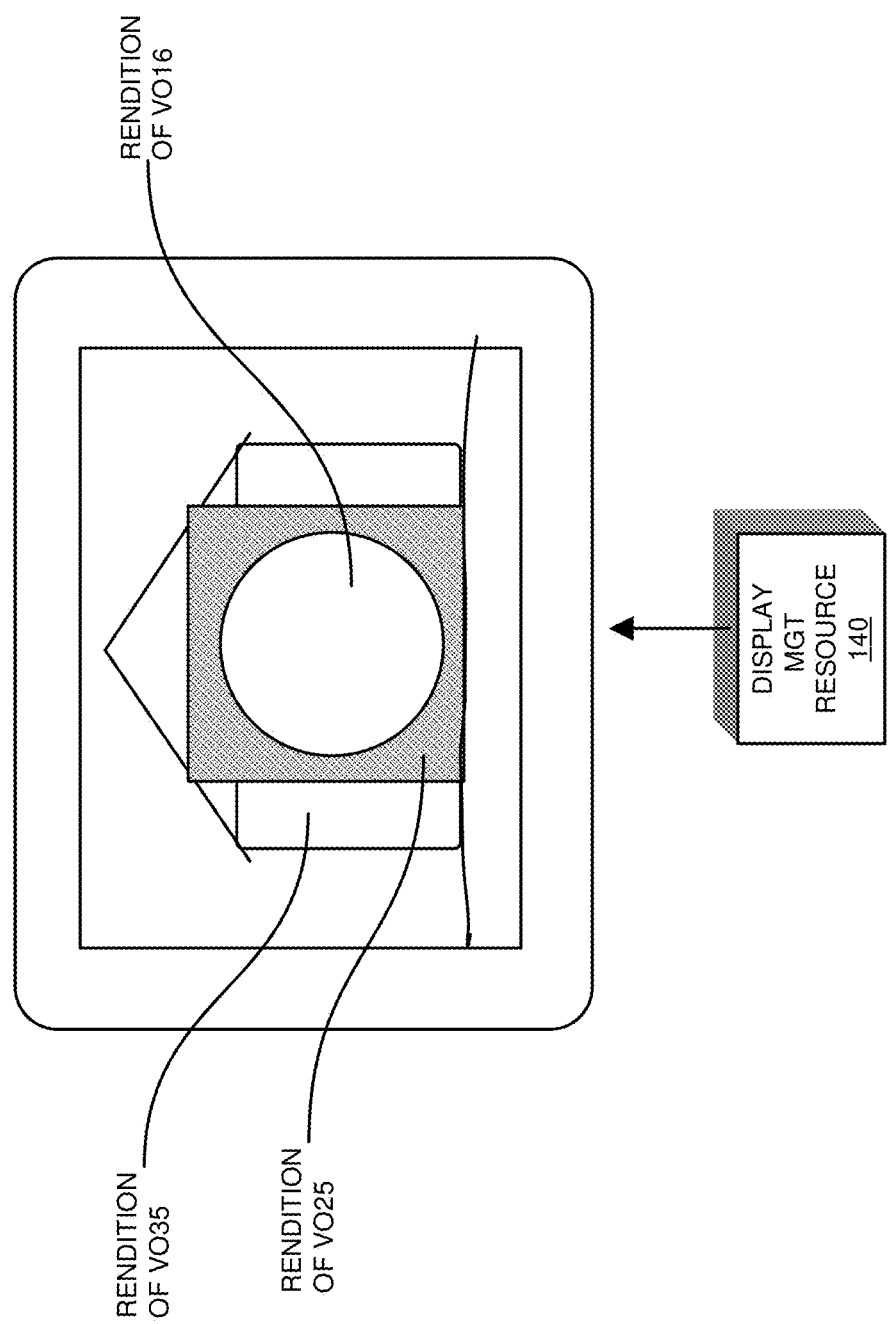
FIG. 8 is an example diagram illustrating display of a perspective view of a virtual image derived for the first location and first orientation of the mobile device according to embodiments herein.

In a manner as previously discussed, the display management resource 140 utilizes the vector 230 to define a viewing window 650 for creating a virtual image from virtual image data 175. As shown in FIG. 13, in reality, the actual viewing window 650 associated with corresponding image sensor device 150 (if activated) captures a partial view of reference object 270 (represented by virtual object VO35) and respective surroundings in the geographical region 210. In this example, the image sensor device 150 of mobile device 120 is pointed to a location to the left of the reference object 270 in the geographical region 210. Assume that the mobile device 120 and corresponding display screen 130 is disposed at a same angular orientation as discussed above in FIG. 6. In such an example embodiment, the display management resource 140 displays a different virtual view on display screen 130 than as shown in FIG. 8 because the mobile device 120 is now located at location L2 instead of location LC.

Figure 14:
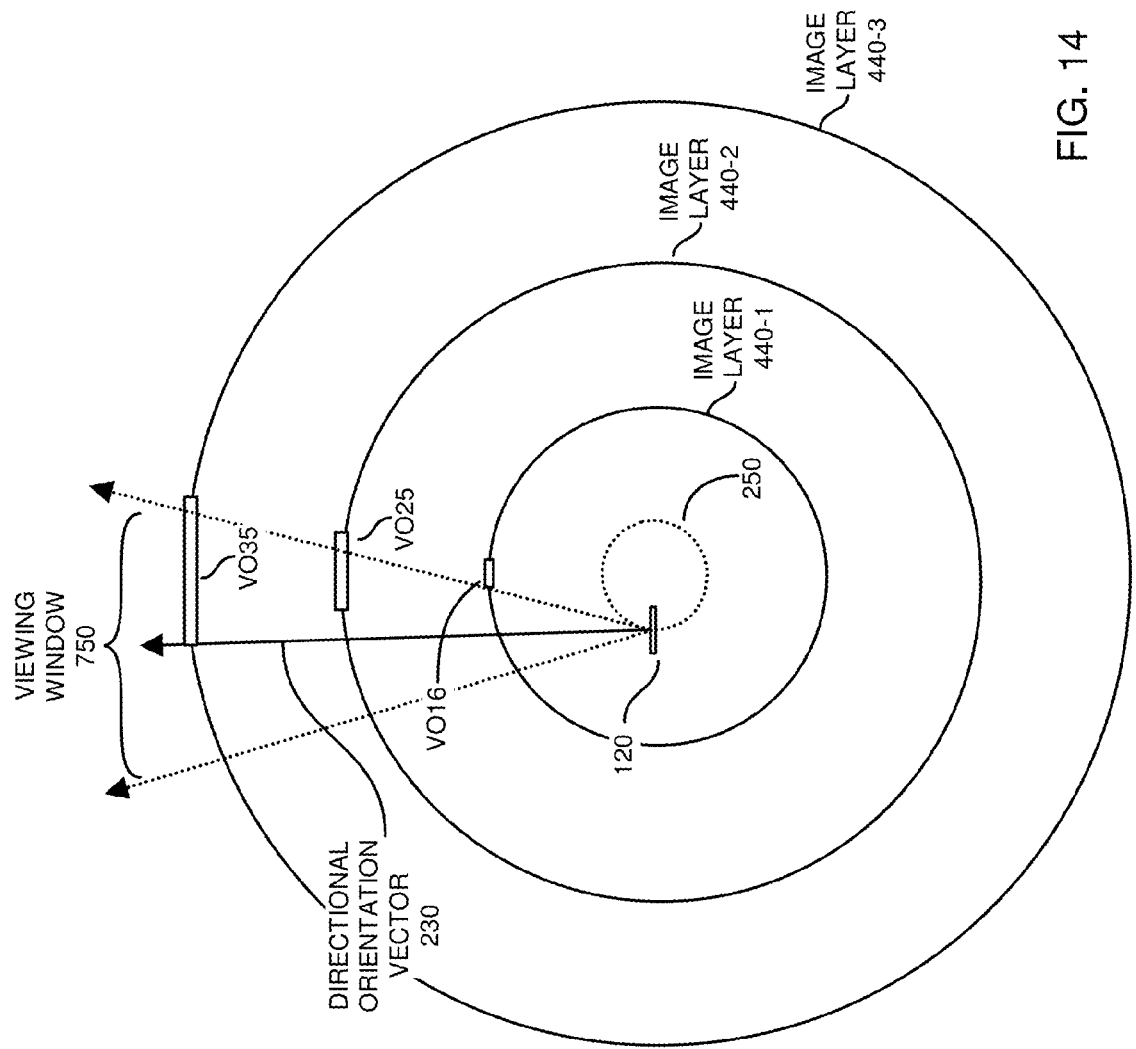
FIG. 14 is an example top-view diagram illustrating angular viewing of virtual objects from the third location and third orientation according to embodiments herein.

As further shown in the following FIG. 14, to account for the change in location and orientation of the mobile device 120 to location L2 and corresponding zero degree orientation, the display management resource 140 produces a virtual image from the perspective of the viewing window 750 (corresponding to viewing window 650). In such an instance, virtual viewing window 750 captures virtual objects in each of one or more virtual image layers 440 to produce a viewable rendition of images for display on display screen 130. Thus, FIG. 14 shows the virtual image that the display management resource 140 will create and display on display screen 130.

Figure 15:
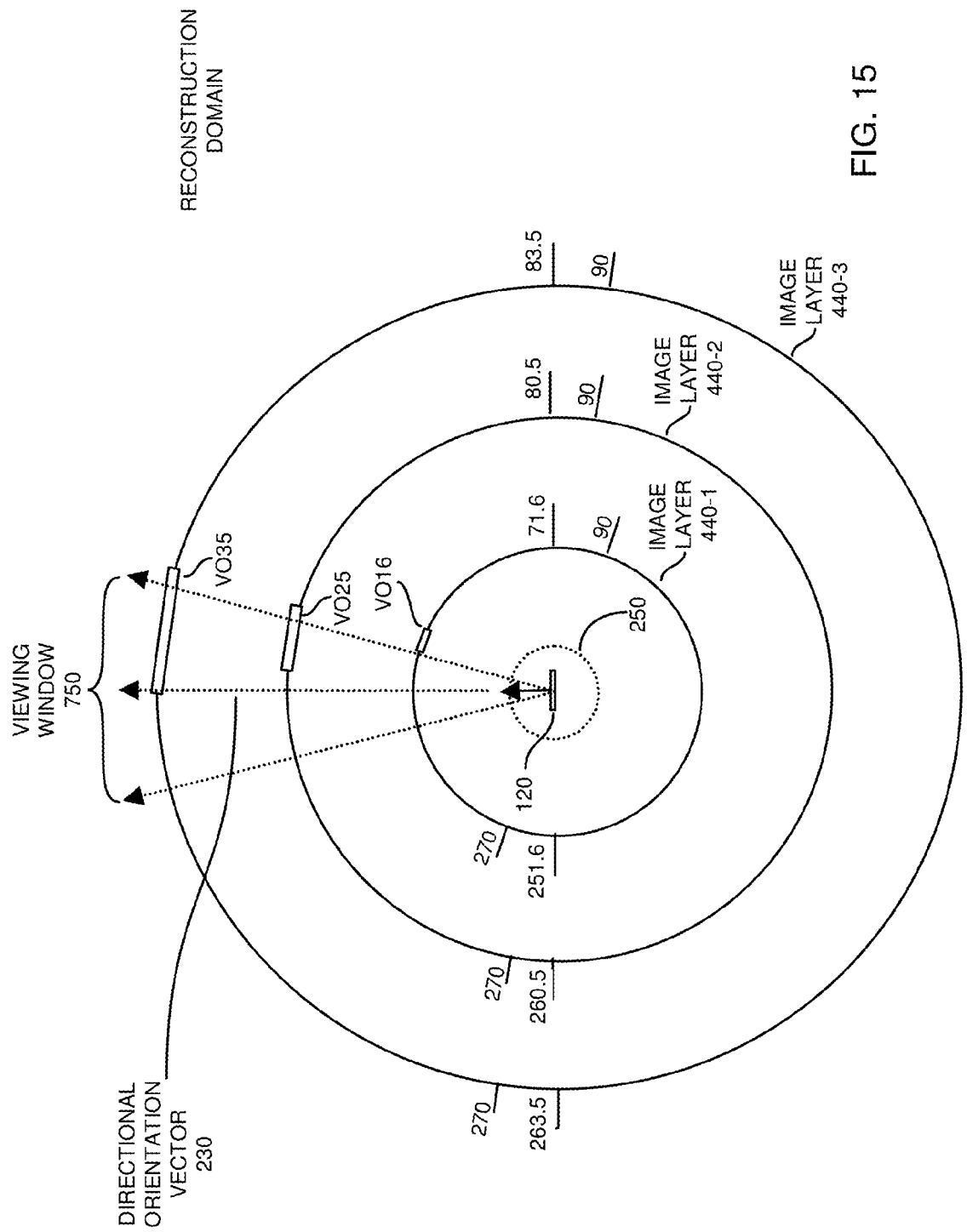
FIG. 15 is an example top-view diagram illustrating construction of a virtual image from a perspective of the third location and the third orientation of a mobile device according to embodiments herein.

As previously discussed, rather than performing complex processing of virtual image data 175 with respect to location L2 and the corresponding orientation as shown in FIG. 13, embodiments herein include producing a respective virtual image for the mobile device 120 at the second location and orientation using the technique shown in FIG. 15. As shown in FIG. 15, the display management resource 140 assumes the mobile device 120 is located at the location LC. However, the display management resource 140 rotationally offsets one or more of the image layers 440 to produce a corresponding virtual image for display on display screen 130 based on the mobile device's current location and orientation.

In other words, based on the current location and orientation of the mobile device 120 in FIG. 13, the display management resource 140 detects that the mobile device 120 is pointed to left side of virtual object VO16 in layer 440-1 as shown in FIG. 15. In such an instance, the left side of virtual object VO16 becomes the center of the virtual image to be displayed on display screen 130. Applying trigonometric calculations based on an orientation and location of the mobile device 120, the display management resource 140 rotates an original orientation of the image layer 440-1 clockwise by a first offset value; the display management resource 140 rotates an original orientation of the image layer 440-2 clockwise by a second offset value; the display management resource 140 rotates an original orientation of the image layer 440-3 clockwise by a third offset value; and so on.

As shown, the rotation of the one or more virtual image layers 440 makes it possible for the display management resource 140 to produce a virtual image from the perspective of the mobile device 120 at the location LC and corresponding orientation even though the mobile device 120 is actually located at location L2.

Figure 16:
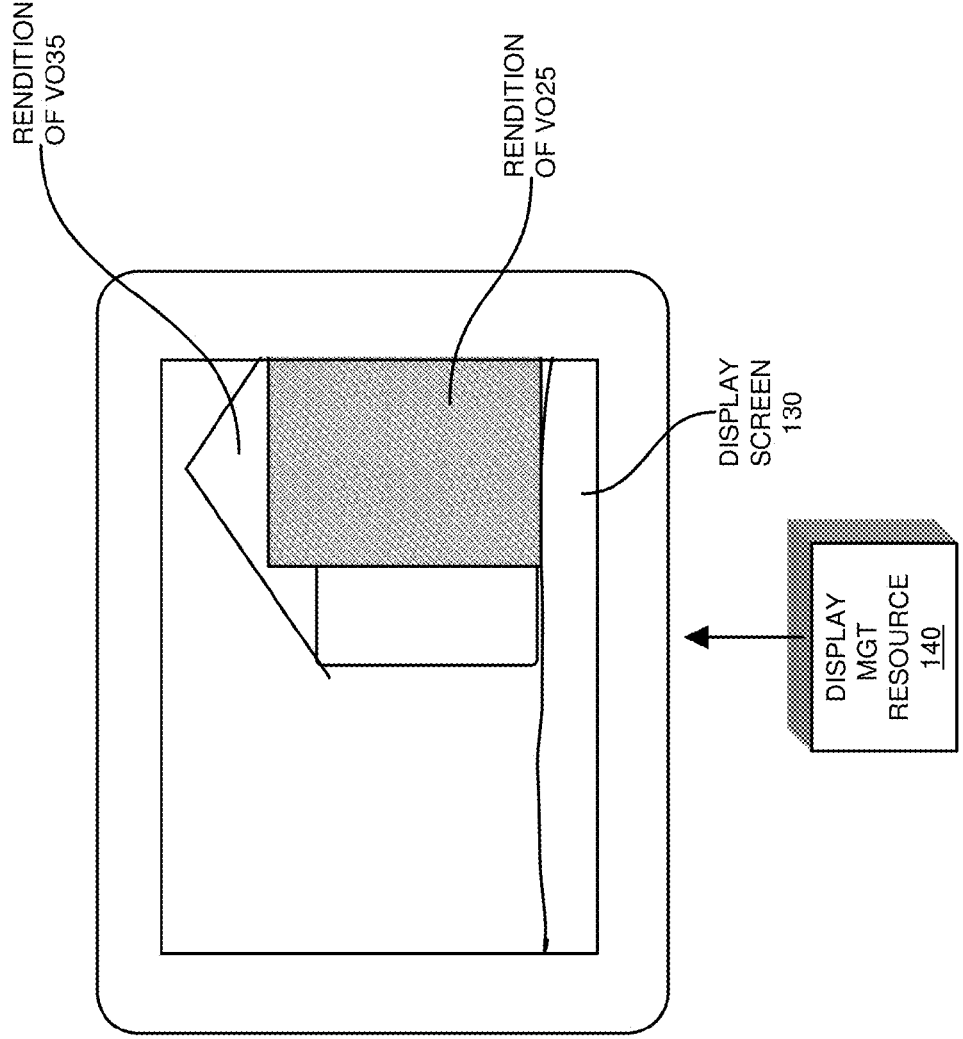
FIG. 16 is an example diagram illustrating display of a perspective view of a virtual image derived for the fourth location and fourth orientation of the mobile device according to embodiments herein.

Subsequent to applying the rotational offsets to one or more image layers 440 based on the user's current location and orientation, in a similar manner as previously discussed, the display management resource 140 identifies which of the virtual objects resides in the viewing window 750 from the perspective of location LC (instead of location L2) and produces the corresponding virtual image as shown in FIG. 16. Because the user 108 resides at the second location and changed the orientation of the mobile device 120, the display management resource 140 displays a different perspective view derived from the virtual three-dimensional space (virtual image data 175).

FIG. 20 is an example diagram illustrating overlaying of a user image on a virtual image according to embodiments herein.

As previously discussed, the mobile device 120 can include any number of image sensor devices such as a first image sensor device and a second image sensor device. The first image sensor device (on a first facing of the mobile device 120) can be configured to detect images of landscape 200 as previously discussed. Also, in a manner as previously discussed, the display management resource 140 creates virtual images for display on display screen 130 depending on a location and orientation of the mobile device 120 and corresponding image sensor devices. In one embodiment, a second image sensor device (such as an image sensor device disposed on a second facing of the mobile device 120) captures an image of the user 108. Thus, the second image sensor device captures real-time images of objects opposite the landscape 205. Display management resource 140 overlays a rendition of the user 2108 onto the generated virtual images to make it appear as though the user 108 is present in the virtual image (as derived from virtual three-dimensional space) displayed on the display screen 130.

Note that any suitable technique can be used to extract display elements representing an object (such as user 108) from the captured image and overlay the image on the display screen 130. The display management resource 140 can be further configured to store the composite image (visual indication and real-time rendition of the user 108) on display screen 130 for subsequent transmission to other users (such as friends of the user 108).

Accordingly, in one embodiment, the display management resource 140 receives an image of the user 108 operating the mobile device 120. The display management resource 140 overlays the image of the user 108 on the rendition of one or more virtual images displayed on the display screen 130 for viewing.

Figure 17:
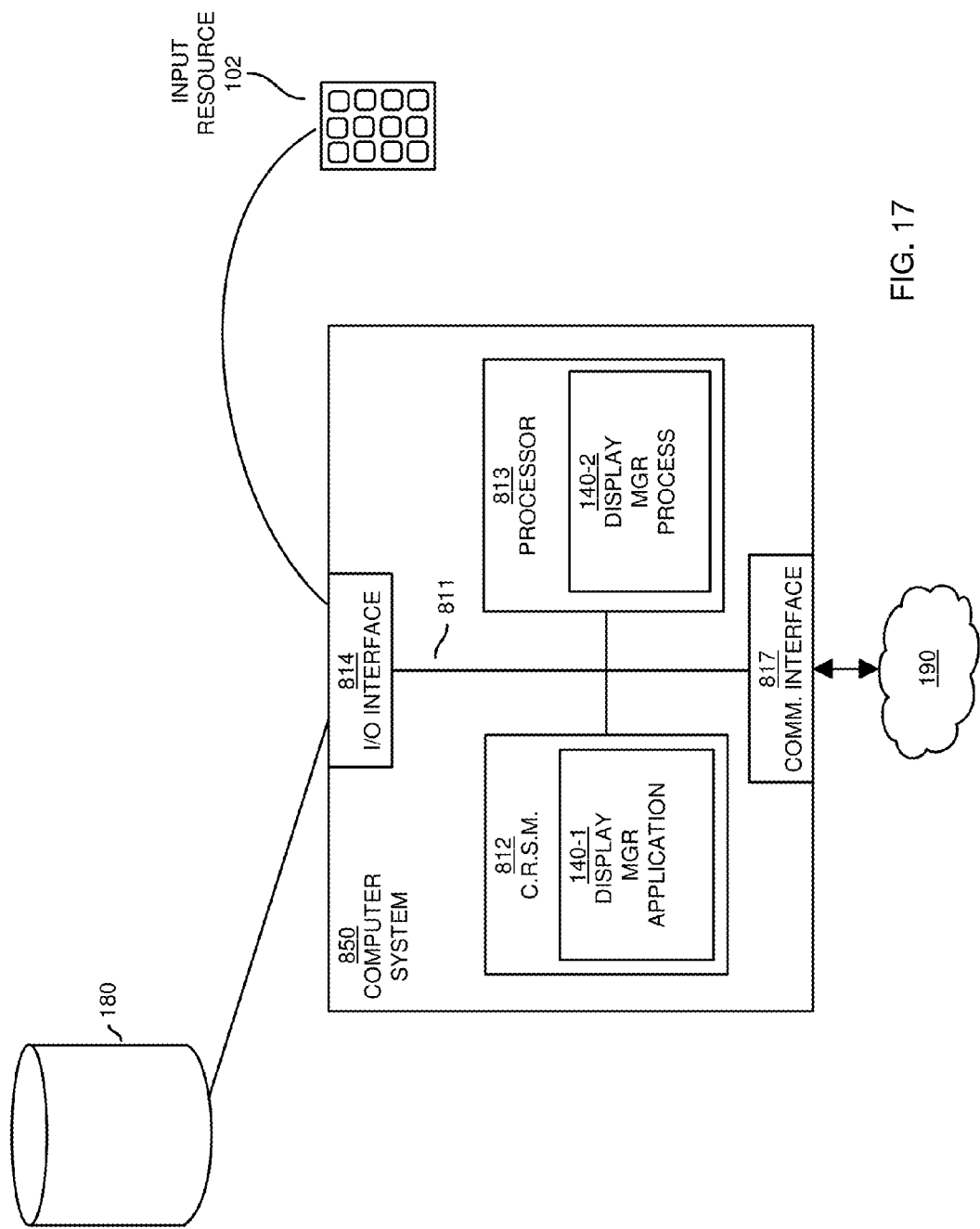
FIG. 17 is a diagram illustrating an example computer architecture in which to execute any of the functionality according to embodiments herein.

FIG. 17 is an example block diagram of a computer device for implementing any of the operations as discussed herein.

As shown, computer system 850 of the present example includes an interconnect 811, a processor 813 (such as one or more processor devices, computer processor hardware, etc.), computer readable storage medium 812 (such as hardware storage to store data), I/O interface 814, and communications interface 817.

Interconnect 811 provides connectivity amongst processor 813, computer readable storage media 812, I/O interface 814, and communication interface 817.

I/O interface 814 provides connectivity to a repository 880 and, if present, other devices such as a playback device, display screen, input resource 102, a computer mouse, etc.

Computer readable storage medium 812 (such as a non-transitory hardware medium) can be any hardware storage resource or device such as memory, optical storage, hard drive, rotating disk, etc. In one embodiment, the computer readable storage medium 812 stores instructions executed by processor 813.

Communications interface 817 enables the computer system 850 and processor 813 to communicate over a resource such as network 190 to retrieve information from remote sources and communicate with other computers. I/O interface 814 enables processor 813 to retrieve stored information such as from repository 180.

As shown, computer readable storage media 812 is encoded with display manager application 140-1 (e.g., software, firmware, etc.) executed by processor 813. Display manager application 140-1 can be configured to include instructions to implement any of the operations as discussed herein.

During operation of one embodiment, processor 813 (e.g., computer processor hardware) accesses computer readable storage media 812 via the use of interconnect 811 in order to launch, run, execute, interpret or otherwise perform the instructions in display manager application 140-1 stored on computer readable storage medium 812.

Execution of the display manager application 140-1 produces processing functionality such as display manager in processor 813. In other words, the display manager process 140-2 associated with processor 813 represents one or more aspects of executing display manager application 140-1 within or upon the processor 813 in the computer system 850.

Those skilled in the art will understand that the computer system 850 can include other processes and/or software and hardware components, such as an operating system that controls allocation and use of hardware resources to execute display manager application 140-1.

In accordance with different embodiments, note that computer system may be any of various types of devices, including, but not limited to, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 may reside at any location or can be included in any suitable resource in network environment 100 to implement functionality as discussed herein.

Functionality supported by the different resources will now be discussed via flowcharts in FIGS. 18 and 19. Note that the steps in the flowcharts below can be executed in any suitable order.

Figure 18:
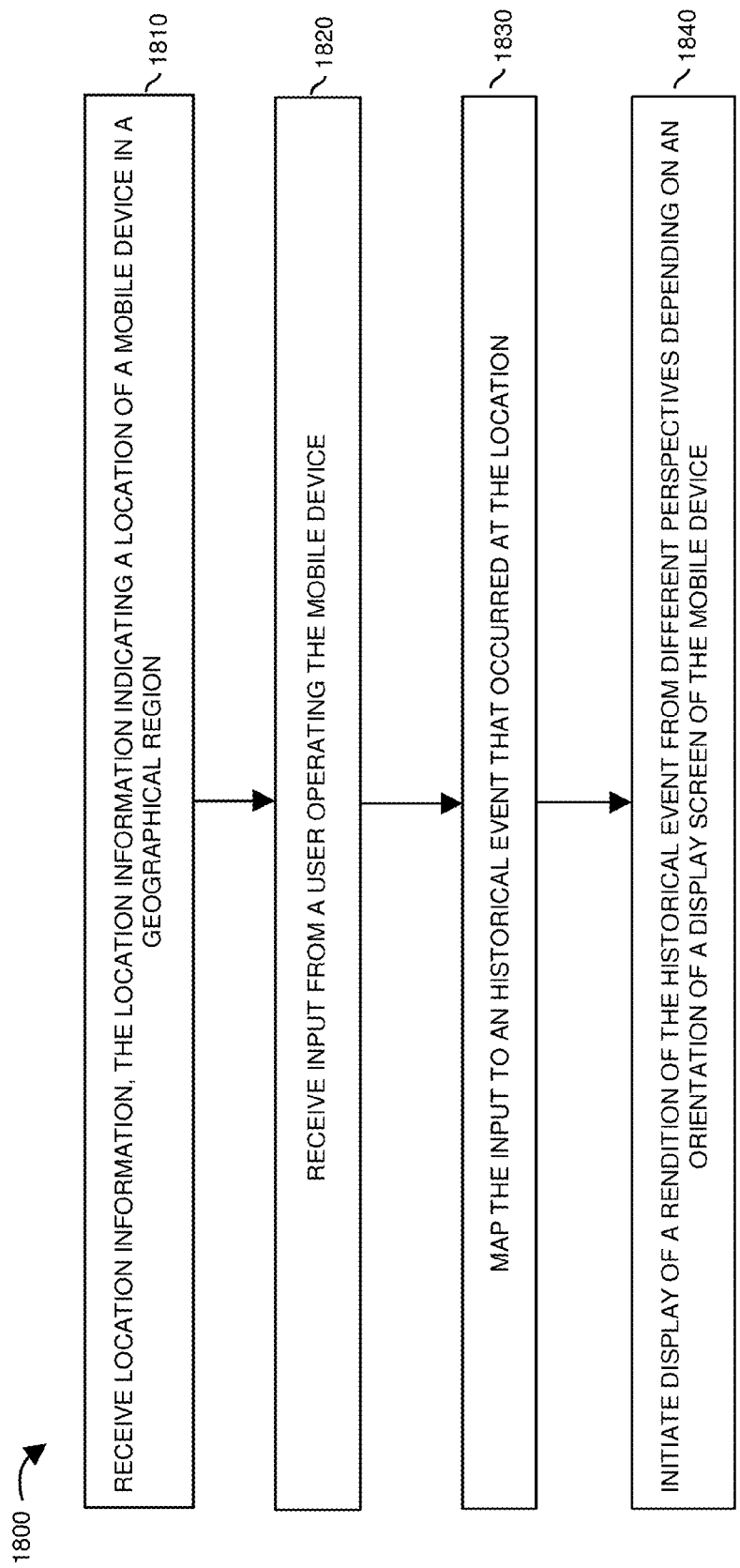
FIGS. 18 and 19 are example diagrams illustrating methods according to embodiments herein.

FIG. 18 is a flowchart 1800 illustrating an example method according to embodiments herein. Note that there will be some overlap with respect to concepts as discussed above.

In processing block 1810, the display manager application 140 receives location information from location detection resource 195. The location information indicates a current location of the mobile device 120-1 in a geographical region.

In processing block 1820, the display manager application 140 receives input 105 from a user 108-1 operating the mobile device 120-1.

In processing block 1830, the display manager application 140 maps the input 105 to virtual images associated with an historical event that occurred at the location.

In processing block 1840, the display manager application 140 initiates display of a rendition of the historical event from different perspectives depending on an orientation of a display screen of the mobile device at the current location.

Figure 19:
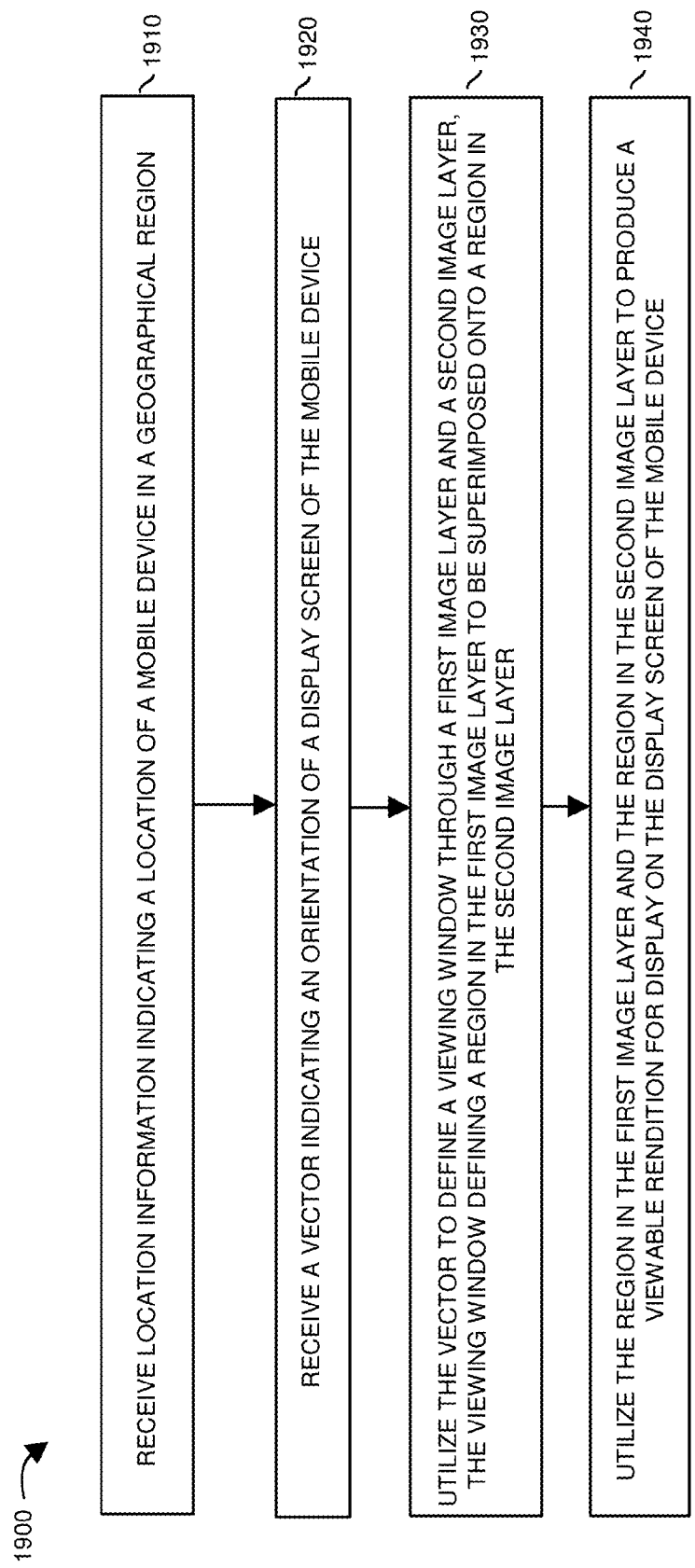

FIG. 19 is a flowchart 1900 illustrating an example method according to embodiments herein. Note that there will be some overlap with respect to concepts as discussed above.

In processing block 1910, the display manager application 140 receives location information from location detection resource 195 indicating a location of the mobile device in a geographical region.

In processing block 1920, the display manager application 140 receives a vector indicating an orientation of a display screen 130 of the mobile device 120-1 at the location.

In processing block 1930, the display manager application 140 utilizes the vector to define a viewing window through a first image layer and a second image layer. The viewing window defines a region in the first image layer to be superimposed onto a region in the second image layer.

In processing block 1940, the display manager application 140 utilizes the region in the first image layer and the region in the second image layer to produce a viewable rendition for display on the display screen 130 of the mobile device 120.

Note again that techniques herein are well suited for use in providing realistic viewing of virtual images (such as recreation of historical events) in a respective geographical region depending on location and orientation of a respective display screen of the mobile device. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   via computer processor hardware:
   receiving location information, the location information indicating a location of a mobile device in a geographical region;
   receiving input from a user operating the mobile device;
   mapping the input to an historical event that occurred at the location; and
   initiating display of a rendition of the historical event from different perspectives depending on an orientation of a display screen of the mobile device at the location;
   the method further comprising:
   calibrating an angular orientation of the display screen in 3-dimensional space;
   wherein calibrating the angular orientation of the display screen of the mobile device includes: initiating display of image information captured by a camera disposed on a facing of the mobile device; initiating display of a reference image on the display screen; and detecting angular movement of the mobile display screen aligning the reference image with a reference object captured by the image information, the reference object located at a predefined position with respect to the location.

2. The method as in claim 1, wherein initiating display of the rendition includes:
   detecting a directional orientation of the mobile device at the location, attributes of the historical event defined in 3-dimensional space in multiple different directions in a vicinity of the location as specified by the location information; and
   dynamically displaying the rendition of the historical event on the display screen from a viewing perspective of the directional orientation of the mobile device located at the location as specified by the location information.

3. The method as in claim 2, wherein detecting the directional orientation includes:
   receiving an image captured by the camera on the mobile device;
   detecting a reference item captured in the image; and
   utilizing the detected reference item in the image as a basis to determine the directional orientation of the mobile device in the geographical region.

4. The method as in claim 2, wherein initiating display of the rendition further comprises:
   producing the rendition of the historical event from the viewing perspective of the directional orientation of the display screen of the mobile device.

5. The method as in claim 1 further comprising:
   initiating display of the rendition of the historical event on the display screen in accordance with a panning motion of the mobile device, the panning motion of the mobile device enabling the user to view actions of the historical event occurring in different angular directions with respect to the location depending on a directional orientation of the camera disposed on the facing of the mobile device.

6. The method as in claim 1, wherein the rendition of the historical event on the mobile device is a reenactment of the historical event.

7. The method as in claim 1, wherein the rendition of the historical event includes actual images of the historical event.

8. The method as in claim 1, wherein the input includes time information specifying a time in history when the historical event occurred.

9. The method as in claim 1 further comprising:
   deriving the rendition of the historical event displayed on the display screen from multiple image layers, each of which defines attributes of objects at different distances from the location of the mobile device.

10. The method as in claim 9, wherein the multiple image layers includes a first image layer and a second image layer, the first image layer defining a first set of virtual objects residing within a first range of distances band with respect to the location, the second image layer defining a second set of virtual objects residing within a second range of distances with respect to the location, the second range of distances disposed further from the location than the first range of distances.

11. The method as in claim 10, wherein deriving the rendition includes:
   producing a vector indicating the orientation of the display screen of the mobile device;
   utilizing the vector to define a viewing window through the first image layer and the second image layer, the viewing window defining a region in the first image layer and a region in the second image layer.

12. The method as in claim 11, wherein deriving the rendition includes:
   detecting a rendition of a first object residing in the region of the first image layer;
   detecting a rendition of a second object residing in the region of the second image layer; and
   initiating display of the rendition of the first object and the rendition of the second object on the display screen of the mobile device.

13. The method as in claim 11, wherein deriving the rendition includes:
   detecting a rendition of a first object residing in the region of the first image layer;

detecting a rendition of a second object residing in the region of the second image layer; and
initiating display of the rendition of the first object over the rendition of the second object on the display screen of the mobile device, the first object appearing to be in front of the second object on the display screen.

14. The method as in claim 1 further comprising:
receiving an image of the user operating the mobile device; and
overlaying the image of the user on the rendition of the historical event on the display screen.

15. A method comprising:
via computer processor hardware:
receiving location information, the location information indicating a location of a mobile device in a geographical region;
receiving input from a user operating the mobile device;
mapping the input to an historical event that occurred at the location; and
initiating display of a rendition of the historical event from different perspectives depending on an orientation of a display screen of the mobile device at the location;
deriving the rendition of the historical event displayed on the display screen from multiple image layers, each of which defines attributes of objects at different distances from the location of the mobile device;
wherein the location is a first location, the method further comprising:
detecting movement of the mobile device to a second location; and
depending on the orientation of the of the display screen at the second location, offsetting the multiple image layers in a direction substantially orthogonal to the direction of viewing to derive the rendition of the historical event displayed on the display screen at the second location.

16. A method comprising:
receiving location information indicating a location of a mobile device in a geographical region;
receiving a vector indicating an orientation of a display screen of the mobile device;
utilizing the vector to define a viewing window through a first image layer and a second image layer, the viewing window defining a region in the first image layer to be superimposed onto a region in the second image layer;
utilizing the region in the first image layer and the region in the second image layer to produce a viewable perspective rendition of virtual images for display on the display screen of the mobile device;
wherein the location is a first location, the method further comprising:
detecting movement of the mobile device to a second location; and
depending on the orientation of the of the display screen at the second location, offsetting the first image layer with respect to second image layer in a direction substantially orthogonal to the direction of viewing to derive the viewable rendition of the historical event displayed on the display screen at the second location.

17. The method as in claim 16, wherein deriving the rendition includes:
detecting a rendition of a first object residing in the region of the first image layer;
detecting a rendition of a second object residing in the region of the second image layer; and
initiating display of the rendition of the first object and the rendition of the second object on the display screen of the mobile device.

18. The method as in claim 16, wherein deriving the rendition includes:
detecting a rendition of a first object residing in the region of the first image layer;
detecting a rendition of a second object residing in the region of the second image layer; and
initiating display of the rendition of the first object over the rendition of the second object on the display screen of the mobile device, the first object displayed in the viewable rendition to be in front of the second object.

19. The method as in claim 16, wherein the viewable rendition is an historical event that occurred at the geographical region in the past, each of the first image layer and the second image layer including virtual objects associated with the historical event.

20. The method as in claim 19, wherein the first image layer defines a first set of virtual objects residing within a first range of distances band with respect to the location, the second image layer defining a second set of virtual objects residing within a second range of distances with respect to the location, the second range of distances disposed further from the location than the first range of distances.

21. The method as in claim 16 further comprising:
receiving an image of a user operating the mobile device; and
overlaying the image of the user on the rendition of the virtual images on the display screen.

22. A computer system comprising:
computer processor hardware; and
a hardware storage resource coupled to the computer processor hardware, the hardware storage resource storing instructions that, when executed by the computer processor hardware, causes the computer processor hardware to perform operations of:
receiving location information indicating a location of a mobile device in a geographical region;
receiving a vector indicating an orientation of a display screen of the mobile device;
utilizing the vector to define a viewing window through a first image layer and a second image layer, the viewing window defining a region in the first image layer to be superimposed onto a region in the second image layer;
utilizing the region in the first image layer and the region in the second image layer to produce a viewable rendition for display on the display screen of the mobile device;
wherein the location is a first location, the method further comprising:
detecting movement of the mobile device to a second location; and
depending on the orientation of the of the display screen at the second location, offsetting the first image layer with respect to second image layer in a direction substantially orthogonal to the direction of viewing to derive the viewable rendition of the historical event displayed on the display screen at the second location.

23. The computer system as in claim 22, wherein deriving the rendition includes:
detecting a rendition of a first object residing in the region of the first image layer;
detecting a rendition of a second object residing in the region of the second image layer; and initiating display of the rendition of the first object and rendition of the second object on the display screen of the mobile device.

\* \* \* \* \*